(12) United States Patent
Hozumi

(10) Patent No.: US 7,333,274 B2
(45) Date of Patent: Feb. 19, 2008

(54) IMAGE TAKING APPARATUS EQUIPPED WITH A ZOOM LENS SYSTEM

(75) Inventor: Kouki Hozumi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 93 days.

(21) Appl. No.: 11/404,781

(22) Filed: Apr. 17, 2006

(65) Prior Publication Data

US 2006/0238888 A1 Oct. 26, 2006

(30) Foreign Application Priority Data

Apr. 26, 2005 (JP) .............................. 2005-127787
May 31, 2005 (JP) .............................. 2005-158490

(51) Int. Cl.
*G02B 15/14* (2006.01)

(52) U.S. Cl. ...................... 359/687; 359/774

(58) Field of Classification Search ........ 359/683–687, 359/715, 774
See application file for complete search history.

(56) References Cited

U.S. PATENT DOCUMENTS 5,798,872 A    8/1998   Uzawa 7,061,686 B2 *  6/2006  Ohtake ........................ 359/687
2004/0136086 A1 7/2004  Ohtake

FOREIGN PATENT DOCUMENTS

JP    2004-252204    9/2004

* cited by examiner

*Primary Examiner*—Hung X. Dang
*Assistant Examiner*—Joseph Martinez
(74) *Attorney, Agent, or Firm*—Kenyon & Kenyon LLP

(57) ABSTRACT

An image taking apparatus is equipped with a zoom lens system which comprises: a first lens unit having a positive refractive power; a second lens unit having a negative refractive power; a third lens unit having a positive refractive power; and a fourth lens unit having a positive refractive power, at least the first lens unit, the second lens unit, and the third lens unit move during zooming from a wide-angle end to a telephoto end so that a space between the first lens unit and the second lens unit increases, a space between the second lens unit and the third lens unit decreases, and a space between the third lens unit and the fourth lens unit increases, and the first lens unit is arranged closer to an image side in the wide-angle end than that in the telephoto end.

25 Claims, 12 Drawing Sheets

IMAGE TAKING APPARATUS EQUIPPED WITH A ZOOM LENS SYSTEM

CROSS REFERENCE TO RELATED APPLICATIONS

This application claims benefit under 35 U.S.C. §119 of Japanese patent applications of No. 2005-127,787, filed in Japan on Apr. 26, 2005 and No. 2005-158,490, filed in Japan on May 31, 2005, the contents of which are incorporated herein by reference.

BACKGROUND OF THE INVENTION

1. Field of the Invention

The present invention relates to an image taking apparatus equipped with a zoom lens system.

2. Description of the Related Art

A compact digital camera is known as an image taking apparatus equipped with a zoom lens system. As the zoom lens system for use in this type of image taking apparatus, a compact negative-lead type is known, but it is difficult to increase the zooming ratio or enlarge the aperture. Therefore, in an optical system in which a higher zooming ratio and a large aperture are demanded, a positive-lead type is used. As the zoom lens system of the positive-lead type, there are zoom lens systems disclosed in Japanese Patent Application Publication Laid-open Nos. 2004-212618, 2004-252204, and Hei 9-61714.

SUMMARY OF THE INVENTION

In the present invention, there is provided an image taking apparatus equipped with a zoom lens system which is small-sized and which has a large angle of view in a wide-angle end and a satisfactory image forming performance.

The first type of the zoom lens system for use in a image taking apparatus of the present invention comprises, in order from an object side, a first lens unit having a positive refractive power; a second lens unit having a negative refractive power; a third lens unit having a positive refractive power; and a fourth lens unit having a positive refractive power, wherein at least the first lens unit, the second lens unit, and the third lens unit move during zooming from a wide-angle end to a telephoto end so that a space between the first lens unit and the second lens unit increases, a space between the second lens unit and the third lens unit decreases, and a space between the third lens unit and the fourth lens unit increases, the first lens unit is composed of a single lens component or a cemented lens component, and is arranged closer to an image side in the wide-angle end than in the telephoto end, and the third lens unit is composed of a positive lens element, a positive lens element, and a negative lens element in order from the object side, the zoom lens system satisfying the following conditions:

$$-0.5 < d2/r1 < 2 \quad\quad (A); \text{ and}$$

$$0.725 < IH/fr < 0.8 \quad\quad (B),$$

wherein IH denotes an image height, fr denotes a focal length of the zoom lens system, d2 denotes the space between the second lens unit and the third lens unit at a time when the focal length fr of the zoom lens system has any value that satisfies the condition (B), and r1 denotes a radius of curvature of a surface closest to the object side in the first lens unit.

Moreover, the second type of the zoom lens system for use in a image taking apparatus comprises, in order from an object side, a first lens unit having a positive refractive power; a second lens unit having a negative refractive power; a third lens unit having a positive refractive power; and a fourth lens unit having a positive refractive power, wherein at least the first lens unit, the second lens unit, and the third lens unit move during zooming from a wide-angle end to a telephoto end so that a space between the first lens unit and the second lens unit increases, a space between the second lens unit and the third lens unit decreases, and a space between the third lens unit and the fourth lens unit increases, the first lens unit is composed of one lens component, and is arranged closer to an image side in the wide-angle end than in the telephoto end, and the following conditions are satisfied:

$$-0.5 < d2/r1 < 2 \quad\quad (A);$$

$$0.725 < IH/fr < 0.8 \quad\quad (B); \text{ and}$$

$$0.8 < h4(w)/h4(t) < 0.9 \quad\quad (1),$$

wherein IH denotes an image height, fr denotes a focal length of the zoom lens system, d2 denotes a space between the second lens unit and the third lens unit at a time when the focal length fr of the zoom lens system has any value that satisfies the condition (B), r1 denotes a radius of curvature of a surface closest to the object side in the first lens unit, h4(w) denotes a height of ray in a case where an axial marginal ray enters an object-side surface of the fourth lens unit in the wide-angle end, and h4(t) denotes a height of ray in a case where an axial marginal ray enters the object-side surface of the fourth lens unit in the telephoto end.

Other features and advantages of the present invention will be set forth in the description which follows, and in part will be obvious from the description. Advantages of the invention may be realized and obtained by means of the instrumentalities and combinations particularly pointed out hereinafter.

DETAILED DESCRIPTION OF THE EMBODIMENTS

Figure 1A:
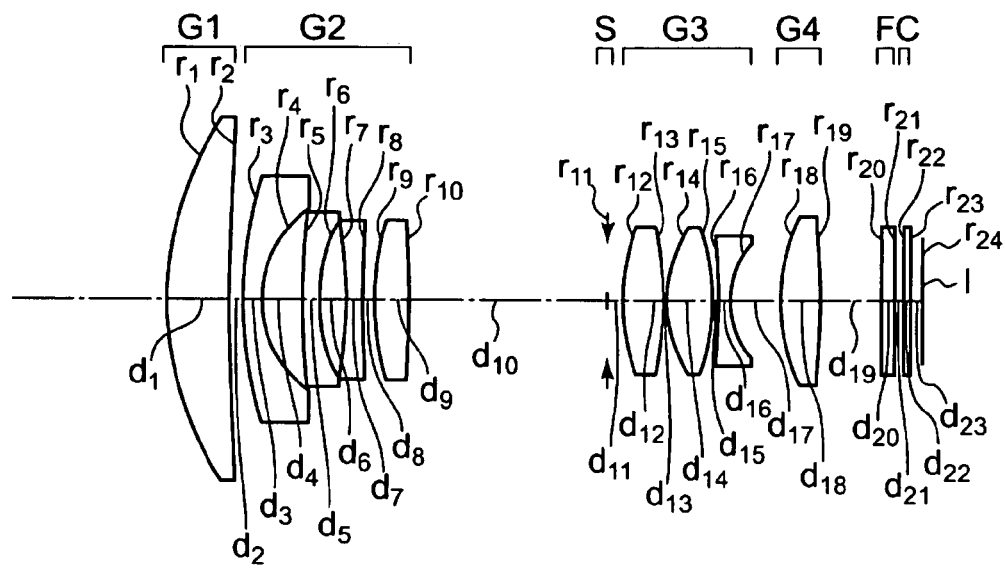
FIGS. 1A to 1C are sectional views of a zoom lens system for use in a image taking apparatus of the present invention along a plane including an optical axis in Example 1.

The present invention will become more fully understood from the detailed description given below and the accompanying drawings, which are given by way of illustration only and thus are not limitative of the present invention.

As described above, the zoom lens system that may be used for the image taking apparatus is a so-called four-unit zoom lens system having an arrangement of positive, negative, positive, and positive refractive powers in order from an object side. The zoom lens system is constituted in this manner for reduction of a size, enlargement of an aperture, and increasing of a zooming ratio because a negative-lead type is disadvantageous for the enlargement of the aperture and the increasing of the zooming ratio.

Moreover, at least first, second, and third lens units move so that the space between the first lens unit and the second lens unit increases, the space between the second lens unit and the third lens unit decreases, and the space between the third lens unit and the fourth lens unit increases during zooming from the wide-angle end to the telephoto end.

According to this constitution, since the first lens unit is disposed closer to the image side in the wide-angle end than in the telephoto end, the diameter of the front lens of the zoom lens system is prevented from being increased. Since both of the second lens unit and the third lens unit share burdens of zooming, the zooming is efficiently performed, and reduction of the total length of the zoom lens system is achieved.

The first lens unit is preferably constituted of one lens component. The height of the off-axial light ray is large, and the angle of the marginal ray to the optical axis is large in the first lens unit. Therefore, the diameter of the front lens easily increases. Moreover, when the number of lenses increases, outer diameters of the lenses also remarkably increase. To avoid this, such constitution is adopted.

Here, the lens component is a lens whose lens surfaces closest to the object side and the image side only come into contact with air and in which any air space is not included between the lens surfaces. Therefore, the lens component includes both a single lens and a cemented lens.

The third lens unit is preferably constituted of a positive lens element, a positive lens element, and a negative lens element, or a positive lens component and a cemented lens component. In this case, a position of the principal point of the third lens unit comes closer to an incidence side. The space for zooming can be secured on the telephoto side. That is, the space between the second lens unit and the third lens unit can be broadened. Since the height of the off-axial ray can be reduced in the wide-angle end, the constitution contributes to miniaturization of the first lens unit and the second lens unit.

Moreover, the third lens unit is a lens unit which performs an important role in not only the zooming but also image formation. Therefore, the constitution of the positive, positive, and negative refractive powers is a constitution which can establish both aberration correction and miniaturization.

In addition to the above-described constitution, an aperture stop is preferably disposed on an incidence side of the third lens unit, and moved integrally with the third lens unit during the zooming.

The third lens unit which largely contributes to the image formation is disposed in the vicinity of the aperture stop. Accordingly, the third lens unit is provided with a refractive power, and an outer diameter of the third lens unit can be reduced. According to such constitution, since there is little change in the height of ray by the zooming, a stable image forming performance is obtained in the whole zooming region.

Moreover, the second lens unit may be constituted of three lens elements including a negative meniscus lens element, a negative lens element, and a positive lens element in order from the object side, or four lens elements including a negative meniscus lens element, a negative meniscus lens element, a negative lens element, and a positive lens element in order from the object side.

When the second lens unit is constituted in this manner, and the position of the principal point of the second lens unit is brought close to the emergence side, the space for the zooming can be secured on the telephoto side. The lateral magnification of the second lens unit can be set to be high, and the zooming function of the second lens unit is improved. Since the position of the entrance pupil shifts toward the object side, the diameter of the front lens can be prevented from being increased.

Next, there will be described miscellaneous conditions to be preferably satisfied by the zoom lens system.

As described above, the zoom lens system satisfies the following condition when the focal length fr of the zoom lens system has any value that satisfies the condition (B):

$$-0.5 < d2/r1 < 2 \qquad (A); \text{ and}$$

$$0.725 < IH/fr < 0.8 \qquad (B),$$

wherein IH denotes an image height, d2 denotes the space between the second lens unit and the third lens unit and r1 denotes the radius of curvature of the surface closest to the object side in the first lens unit.

Above the upper limit of 2 in the condition (A), the space between the second lens unit and the third lens unit increases, or the outer diameter of the first lens unit increases, and the lens system is enlarged. Below the lower limit of −0.5, a high zooming ratio cannot be secured.

Moreover, the following condition (1) is preferably satisfied:

$$0.8 < h4(w)/h4(t) < 0.9 \qquad (1)$$

This condition relates to the height of an axial marginal ray in the fourth lens unit. This condition is preferably satisfied in order to realize the following:

changes of the height of the axial marginal ray in the fourth lens unit be suppressed in order to reduce change of the spherical aberration by the zooming; and the height of the axial marginal ray in the fourth lens unit be slightly increased on the telephoto side, and a negative spherical aberration be strongly generated to cancel a positive spherical aberration generated because the height of ray in the second lens unit is increased in the telephoto end.

Above the upper limit of 0.9 in this condition (1), it becomes difficult to correct the positive spherical aberration generated in the second lens unit on the telephoto side. Below the lower limit of 0.8, a large negative spherical aberration is generated on the telephoto side.

Moreover, the following condition (2) is preferably satisfied:

$$2 < f4/fw < 3.5 \qquad (2),$$

wherein f4 denotes a focal length of the fourth lens unit, and fw denotes a focal length of the zoom lens system in the wide-angle end.

This condition (2) defines an appropriate refractive power of the fourth lens unit. If the refractive power is larger than the upper limit of 3.5 in this condition, the refractive power of the fourth lens unit weakens, an effect of setting the exit pupil to be distant (reducing the incidence angle onto the image sensor such as a CCD image sensor) weakens, and shading characteristic is degraded. The total length of the lens system lengthens. In a case where the fourth lens unit is used as a lens unit for focusing, a sensitivity of the movement of the fourth lens unit with respect to focus adjustment decreases, the space required for the movement of the fourth lens unit for the focusing enlarges, and it becomes difficult to secure the space. An effect of reducing the spherical aberration change by the zooming cannot be obtained.

Below the lower limit of 2 in the condition (2), the back focus shortens, and the space required for disposing an optical filter cannot be secured. The change of the position of the exit pupil during the zooming increases, and the change of the incidence angle onto the CCD image sensor increases. Therefore, it becomes difficult to keep satisfactory shading characteristic in the whole zooming region. The height of the off-axial ray in the first and second lens units in the wide-angle end increase, and the lens diameter is increased.

Moreover, the following condition (3) is preferably satisfied:

$$0.9 < f1/Lw < 1.2 \qquad (3),$$

wherein f1 denotes a focal length of the first lens unit, and Lw denotes a total length of the whole zoom lens system in the wide-angle end.

This condition (3) defines the relation between the focal length of the first lens unit and the total length of the zoom lens system in the wide-angle end. This condition means that the image to be formed by the first lens unit in the wide-angle end has substantially the same position as that of the image surface of the zoom lens system. Accordingly, it is possible to make the second lens unit have a better zooming efficiency in the whole zoom region. Therefore, the space required for the zooming can be reduced, and the total length of the zoom lens system can be reduced.

Above the upper limit of 1.2 in this condition (3), the refractive power of the first lens unit weakens, the position of the image formed by the ray entering the second lens unit becomes distant, and the lateral magnification of the second lens unit is reduced. Therefore, the zooming efficiency of the second lens unit deteriorates, and the movement amount of the first lens unit during the zooming increases. This incurs enlargement of the lens unit.

Below the lower limit of 0.9 in this condition (3), the refractive power is excessively high with respect to the diameter of the first lens unit. Therefore, desired refractive power cannot be obtained with a single lens component or a cemented lens component only. Since the angle of the off-axial ray in the wide-angle end is large, a lens having a large outer diameter is required in a case where the number of the lenses is increased. This incurs enlargement of the zoom lens system.

Moreover, the following condition (4) is preferably satisfied:

$$2.7 < D2(w)/D3(w) < 5.0 \qquad (4),$$

wherein $D2(w)$ denotes a space between the second lens unit and the third lens unit in the wide-angle end, and $D3(w)$ denotes a space between the third lens unit and the fourth lens unit in the wide-angle end.

This condition (4) defines an appropriate arrangement of the spaces between the units in the wide-angle end. Above the upper limit of 5.0 in this condition (4), the height of the ray increases when the off-axial ray enters or exits from the first and second lens units. Therefore, the diameter of the front lens increases, and the lens unit is enlarged. Below the lower limit of 2.7, the space for zooming decreases, and it therefore becomes difficult to increase the zooming ratio.

Moreover, the following condition (5) is preferably satisfied:

$$5 < |f1/f2| < 5.7 \qquad (5),$$

wherein f1 denotes the focal distance of the first lens unit, and f2 denotes the focal distance of the second lens unit.

This condition (5) is a condition for imparting to the second lens unit an appropriate zooming function from the wide-angle end to the telephoto end. Above the upper limit of 5.7 in this condition (5), the position of the image-side focal point of the first lens unit becomes distant from the position of the object-side focal point of the second lens unit. Therefore, the zooming is performed in a region in which the second lens unit has a low image forming magnification. Therefore, the zooming efficiency is reduced, the movement for the zooming of the first lens unit increases, and the total length of the zoom lens system increases in the telephoto end. Alternatively, the refractive power of the second lens unit becomes excessively strong, and the aberration generated in the second lens unit increases. Below the lower limit of 5 in the condition (5), the refractive power of the first lens unit increases, and it is difficult to constitute the first lens unit with the single lens component or the cemented lens component. The refractive power of the second lens unit weakens, and the zooming function weakens. As a result, a heavy zooming burden is imposed on the third lens unit during the zooming, and an increase of the F number is incurred in the telephoto end.

Moreover, the following condition (6) is preferably satisfied:

$$0.6 < f3/f4 < 1.2 \qquad (6),$$

wherein f3 denotes a focal length of the third lens unit, and f4 denotes a focal length of the fourth lens unit.

This condition (6) defines a shared ratio of an image forming function. Above the upper limit of 1.2 in the condition (6), the image forming function of the third lens unit weakens, and the total length of the zoom lens system increases. Alternatively, since the refractive power of the fourth lens unit strengthens, the change of the position of the exit pupil by the zooming increases, and it becomes difficult to maintain the shading characteristic to be satisfactory. Below the lower limit of 0.6 in the condition (6), since the refractive power of the third lens unit strengthens, the curvature of each lens surface is increased, and the aberration cannot be satisfactorily corrected in a case where the aperture is enlarged. Alternatively, since the refractive power of the fourth lens unit weakens, the movement of the lens unit during the focusing increases, and it becomes difficult to secure a sufficient space for focusing movement.

Moreover, the following condition (7) is preferably satisfied:

$$0.3 < D3(t)/ft < 0.7 \qquad (7),$$

wherein $D3(t)$ denotes a space between the third lens unit and the fourth lens unit in the telephoto end, and ft denotes a focal length of the zoom lens system in the telephoto end.

This condition (7) defines a refractive power arrangement in the telephoto end. Above the upper limit of 0.7 in the condition (7), the height of the ray on the incidence surface decreases in a case where the axial marginal ray enters the fourth lens unit. Therefore, the positive spherical aberration generated in the second lens unit in the telephoto end cannot be corrected. Since the movement of the third lens unit for the zooming increases, the F number increases, and the zoom lens system becomes dark. Since the total length of the zoom lens system increases, it becomes difficult to miniaturize the lens holding mechanism. Below the lower limit of 0.3 in the condition (7), contrary to the foregoing, the height of the ray on the incidence surface excessively increases in a case where the axial marginal ray enters the fourth lens unit, and a negative spherical aberration is generated. Since the zooming burden is imposed on the first and second lens units, and the entrance pupil is easily disposed in a deep position. Therefore, the height of the off-axial ray in the first lens unit increases, and it becomes difficult to secure a quantity of light in the periphery of the image surface.

Furthermore, the following condition (8) is preferably satisfied:

$$1.6 < h3(w)/h'3(w) < 1.8 \qquad (8),$$

wherein $h3(w)$ denotes a height of ray in a case where the axial marginal ray enters the object-side surface of the third lens unit in the wide-angle end, and $h'3(w)$ denotes a height of ray in a case where the axial marginal ray exits from the image-side surface of the third lens unit in the wide-angle end.

This condition (8) relates to the height of the axial marginal ray in the third lens unit. Above the upper limit of 1.8 in the condition (8), a difference between the ray heights excessively increases. Therefore, a high-order aberration is easily generated in a case where the spherical aberration generated in the lens disposed on the incidence side in the third lens unit is corrected with the negative lens on the exit side in the third lens unit. The change of the curvature of field due to the manufacturing error in the lens thickness or the like unfavorably increases. Below the lower limit of 1.6 in the condition (8), the shift amount of the principal point position of the third lens unit toward the object side is reduced, and it therefore becomes difficult to secure the space for the zooming. Moreover, the back focus lengthens unfavorably for the miniaturization of the lens holding mechanism.

Additionally, the following condition (9) is preferably satisfied:

$$1.5 < h3(t)/h'3(t) < 1.7 \qquad (9),$$

wherein $h3(t)$ denotes a height of ray in a case where the axial marginal ray enters the object-side surface of the third lens unit in the telephoto end, and $h'3(t)$ denotes a height of ray in a case where the axial marginal ray exits from the image-side surface of the third lens unit in the telephoto end.

This condition (9) relates to the height of the axial marginal ray in the third lens unit. Above the upper limit of 1.7 in the condition (9), the difference between the ray heights excessively increases. Therefore, the high-order aberration is easily generated in a case where the spherical aberration generated in the lens disposed on the incidence side in the third lens unit is corrected with the negative lens on the emission side in the third lens unit. The change of the curvature of field due to the manufacturing error in the lens thickness or the like unfavorably increases. Below the lower limit of 1.5 in the condition (9), the shift amount of the principal point position of the third lens unit toward the object side is reduced, and it therefore becomes difficult to secure the space for the zooming. Moreover, the back focus lengthens unfavorably for the miniaturization of the lens holding mechanism.

As to the material of the lens, the refractive index of the glass material of each of first and second negative lens elements of the second lens unit as viewed from the object side is preferably 1.81 or more, and the refractive index of the positive lens of the second lens unit is 1.85 or more.

To suppress distortion on the wide-angle side, it is necessary to reduce the incidence angle of the off-axial ray on the incidence surface of the second lens unit. Therefore, the refractive index of the negative lens is preferably high.

When the refractive index of the glass material of each of the first and second negative lenses of the second lens unit is below 1.81, the Petzval sum increases, and the curvature of field occurs in the periphery of the image surface. The distortion on the wide-angle side cannot be corrected.

Moreover, in a case where the refractive index of the positive lens of the second lens unit is below 1.85 while the glass material of each of the first and second negative lenses of the second lens unit satisfies the condition that the refractive index be 1.81 or more, it is difficult to find out a glass combination capable of correcting the chromatic aberration of magnification in a range of actually usable glass materials. The spherical aberration on the telephoto side increases.

More preferably, the second lens unit does not include any aspherical surface.

To correct the curvature of field and the distortion in the wide-angle end, as viewed from the object side, the second lens unit may be constituted of three lens elements including a negative meniscus lens element, a negative lens element, and a positive lens element, or four lens elements including a negative meniscus lens element, a negative meniscus lens element, a negative lens element, and a positive lens element. Alternatively, the refractive index of the glass material of each of the first and second negative lenses of the second lens unit may be set to 1.81 or more, and the refractive index of the positive lens of the second lens unit is set to 1.85 or more. Alternatively, an aspherical surface may be introduced into the second lens unit (especially the front-side negative lens). However, since the diameter and the edge thickness of each lens in the second lens unit are large, it becomes difficult to manufacture the lens when an aspherical surface is introduced. This unfavorably increases costs.

When the above-described constitutions or conditions are appropriately combined, combined effects are produced. Therefore, such constitution is more effective.

Next, there will be described numerical examples of the zoom lens system usable in the image taking apparatus of the present invention. FIGS. 1A to 5C are sectional views of Numerical Examples 1 to 5 along the plane including the optical axis. Each of the drawings shows the lens arrangement at a time when the lens is focused on an infinite object. FIGS. 1A, 2A, 3A, 4A, and 5A show sectional views in the wide-angle ends, FIGS. 1B, 2B, 3B, 4B, and 5B show sectional views in the intermediate focal length states, and FIGS. 1C, 2C, 3C, 4C, and 5C show sectional views in the telephoto ends, respectively. In these drawings, G1 denotes a first lens unit, G2 denotes a second lens unit, S denotes an aperture stop, G3 denotes a third lens unit, and G4 denotes a fourth lens unit. Furthermore, F denotes parallel flat plates constituting a low pass filter coated with an IR cut coating, C denotes parallel flat plates constituting a cover glass of an electronic image sensor, and I denotes an image surface. It is to be noted that the surface of the cover glass C may be coated with a multi-layer optical thin film for restricting a wavelength region. A low pass filter function may be imparted to the cover glass C.

Figure 1B:
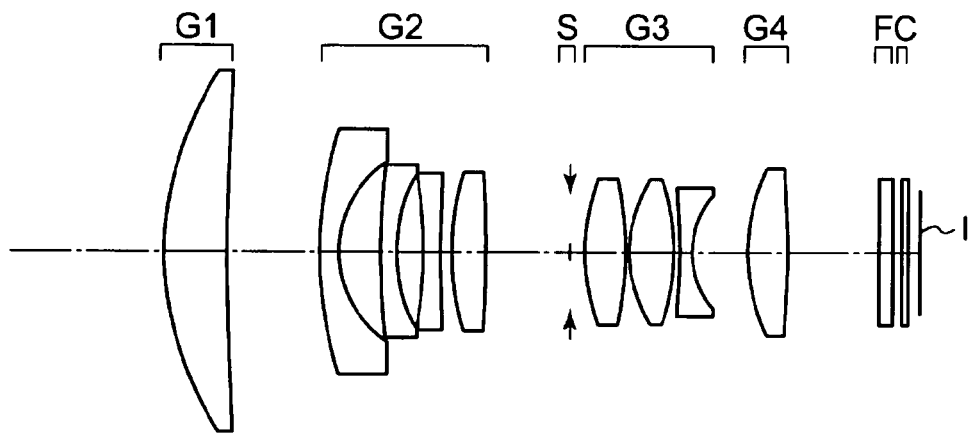
Figure 1C:
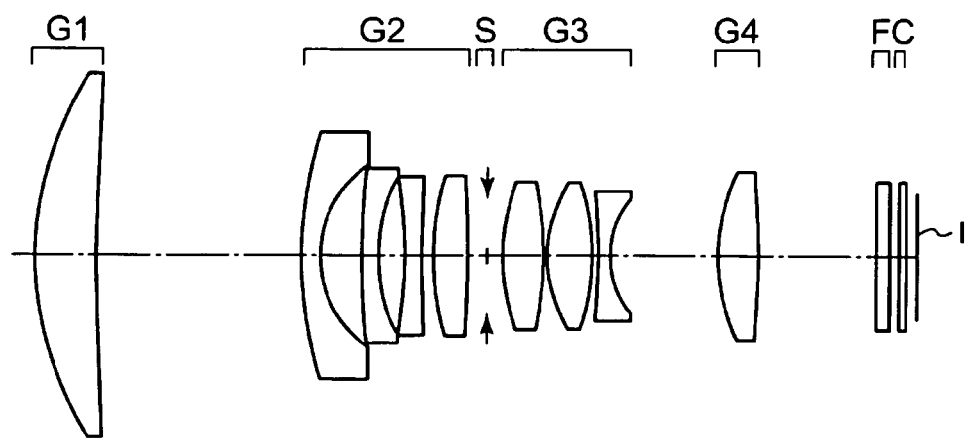

In Example 1, as shown in FIGS. 1A to 1C, the zoom lens system includes, in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. During zooming from a wide-angle end to a telephoto end, the first lens unit G1 moves toward the object side. The second lens unit G2 moves while drawing a locus that is convex toward an image side, and the second lens unit is arranged slightly closer to an image side in the telephoto end than in the wide-angle end. The aperture stop S and the third lens unit G3 integrally move toward the object side, and the fourth lens unit G4 moves toward the object side while expanding a space between the fourth lens unit and the third lens unit G3.

In order from the object side, the first lens unit G1 includes one positive meniscus lens which directs its convex surface on the object side. The second lens unit G2 includes, in order from the object side, two negative meniscus lenses which direct their convex surfaces on the object side, a double-concave negative lens, and a double-convex positive lens. The third lens unit G3 includes two double-convex positive lenses and a double-concave negative lens in order from the object side. The fourth lens unit G4 includes one double-convex positive lens.

Aspherical surfaces are used in four surfaces: opposite surfaces of the double-convex positive lens on the object side in the third lens unit G3; and opposite surfaces of the double-convex positive lens of the fourth lens unit G4.

Figure 2A:
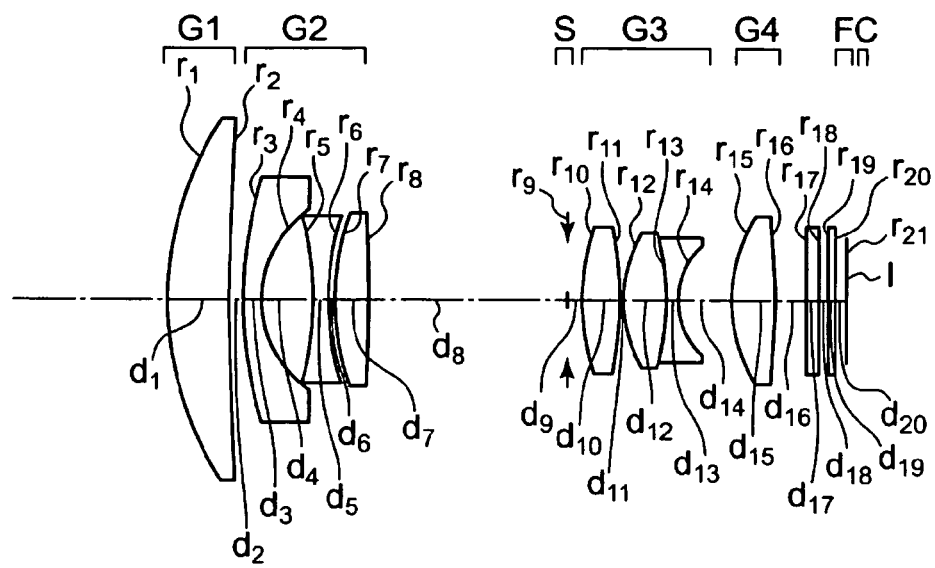
FIGS. 2A to 2C are sectional views of a zoom lens system for use in a image taking apparatus of the present invention along a plane including an optical axis in Example 2.
Figure 2B:
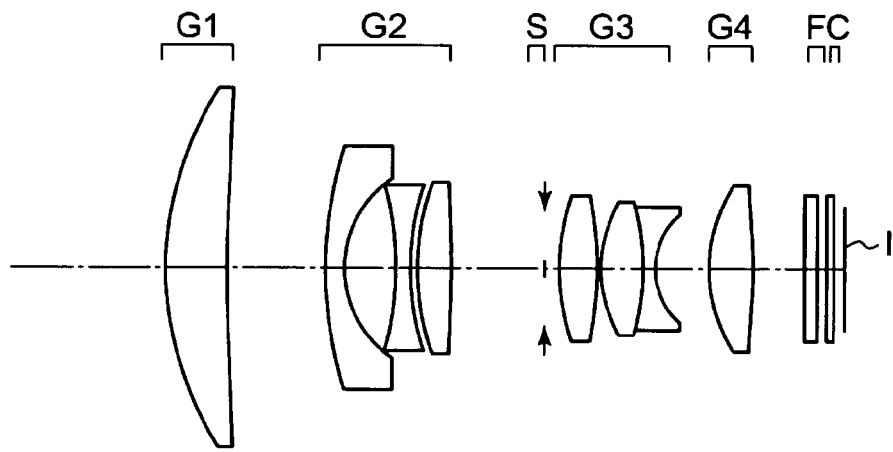
Figure 2C:
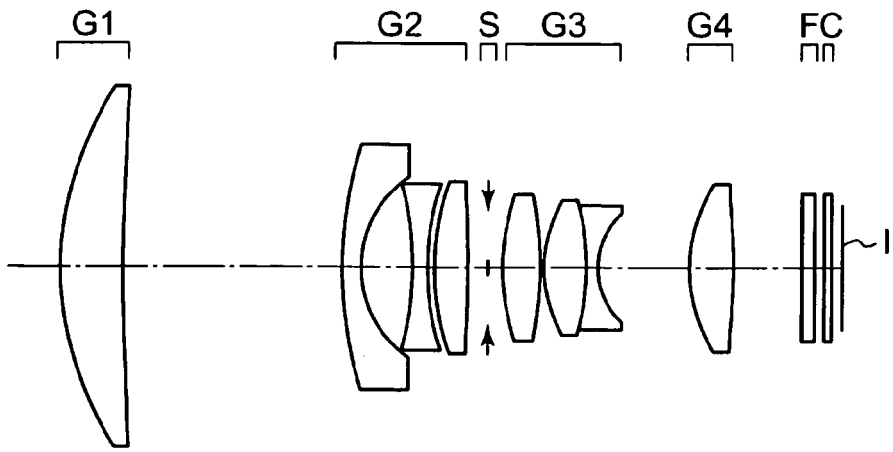

In Example 2, as shown in FIGS. 2A to 2C, the zoom lens system includes, in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. During zooming from a wide-angle end to a telephoto end, the first lens unit G1 moves toward the object side, the second lens unit G2 moves toward an image side, the aperture stop S and the third lens unit G3 integrally move toward the object side, and the fourth lens unit G4 moves toward the object side while expanding a space between the fourth lens unit G4 and the third lens unit G3.

In order from the object side, the first lens unit G1 includes a positive meniscus lens which directs its convex surface on the object side. The second lens unit G2 includes, in order from the object side, a negative meniscus lens which directs its convex surface on the object side, a double-concave negative lens, and a double-convex positive lens. The third lens unit G3 includes, in order from the object side, a double-convex positive lens, and a cemented lens of a double-convex positive lens and a double-concave negative lens. The fourth lens unit G4 includes a double-convex positive lens.

Aspherical surfaces are used in four surfaces: opposite surfaces of the double-convex positive lens of the third lens unit G3; and opposite surfaces of the double-convex positive lens of the fourth lens unit G4.

Figure 3A:
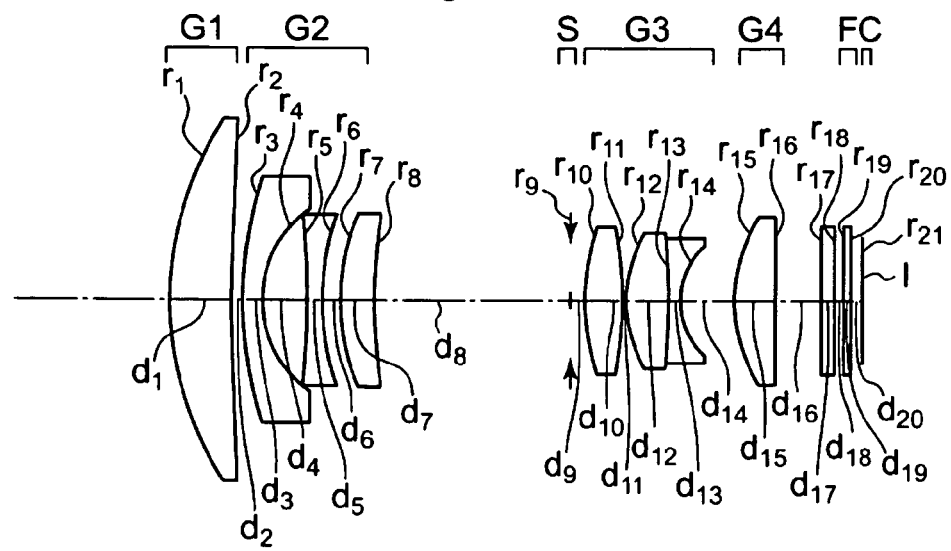
FIGS. 3A to 3C are sectional views of a zoom lens system for use in a image taking apparatus of the present invention along a plane including an optical axis in Example 3.
Figure 3B:
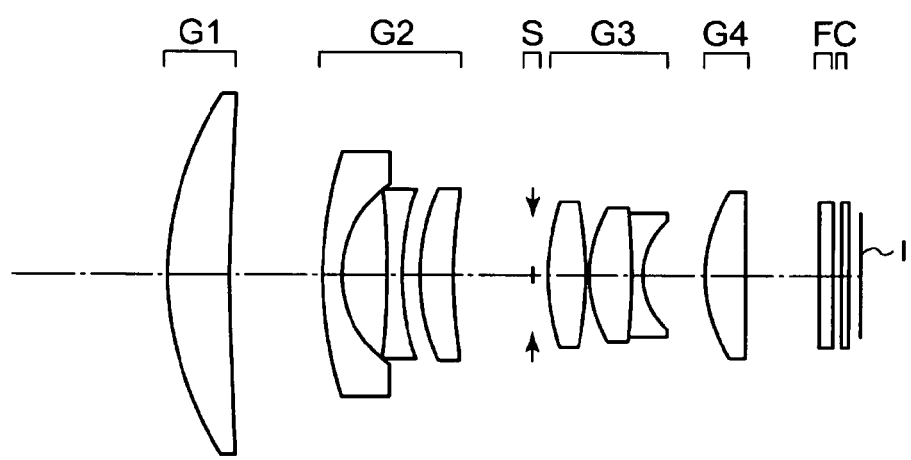
Figure 3C:
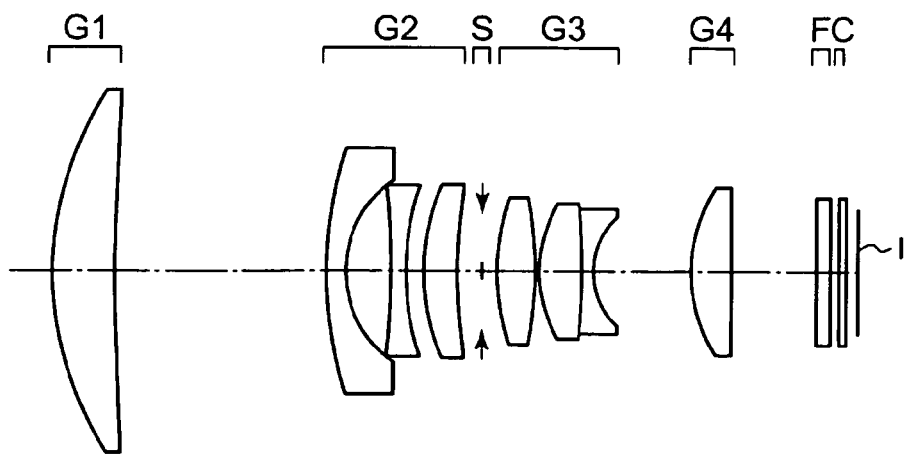

In Example 3, as shown in FIGS. 3A to 3C, the zoom lens system includes, in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. During zooming from a wide-angle end to a telephoto end, the first lens unit G1 moves toward the object side, the second lens unit G2 moves toward an image side, the aperture stop S and the third lens unit G3 integrally move toward the object side, and the fourth lens unit G4 moves toward the object side while expanding a space between the fourth lens unit and the third lens unit G3.

The first lens unit G1 includes a positive meniscus lens which directs its convex surface on the object side. The second lens unit G2 includes, in order from the object side, a negative meniscus lens which directs its convex surface on the object side, a double-concave negative lens, and a positive meniscus lens which directs its convex surface on the object side. The third lens unit G3 includes, in order from the object side, a double-convex positive lens, and a cemented lens of a double-convex positive lens and a double-concave negative lens. The fourth lens unit G4 includes a double-convex positive lens.

Aspherical surfaces are used in four surfaces: opposite surfaces of the double-convex positive lens of the third lens unit G3; and opposite surfaces of the double-convex positive lens of the fourth lens unit G4.

Figure 4A:
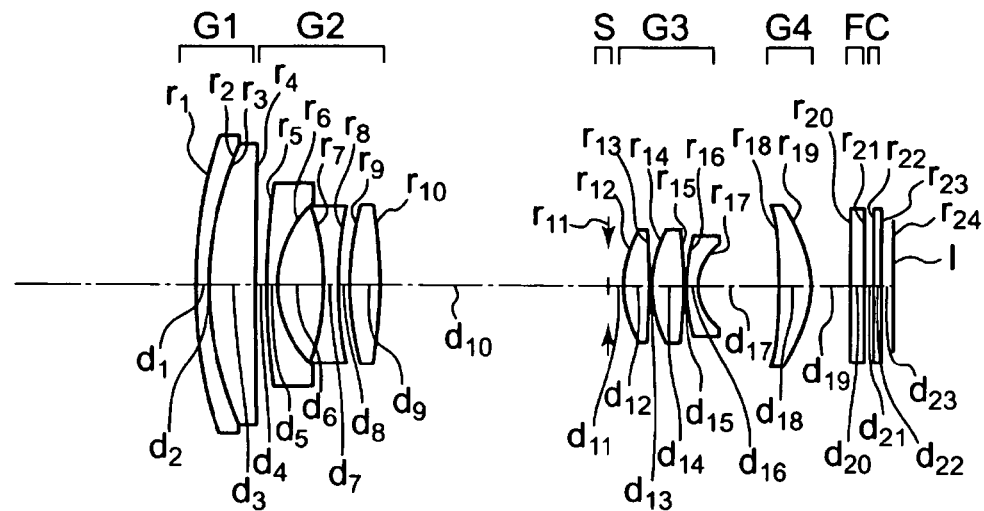
FIGS. 4A to 4C are sectional views of a zoom lens system for use in a image taking apparatus of the present invention along a plane including an optical axis in Example 4.
Figure 4B:
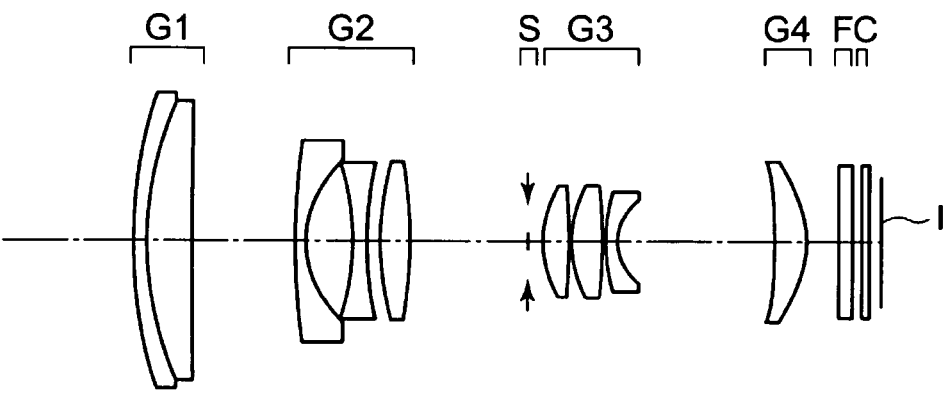
Figure 4C:
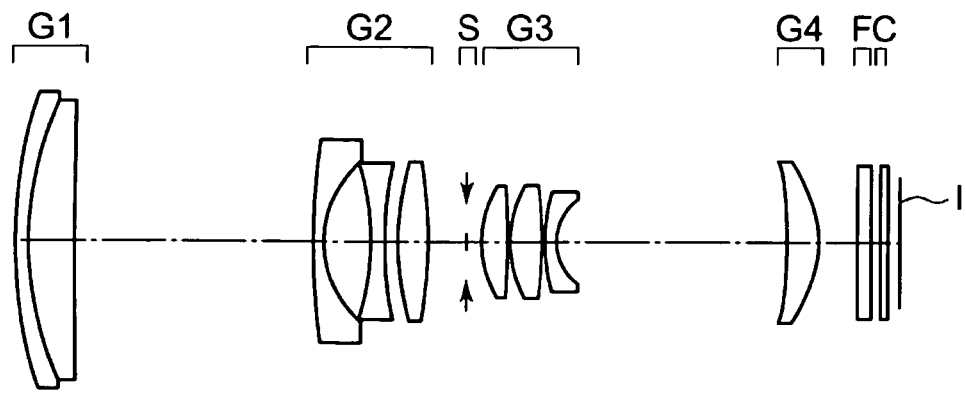

In Example 4, as shown in FIGS. 4A to 4C, the zoom lens system includes, in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. During zooming from a wide-angle end to a telephoto end, the first lens unit G1 moves toward the object side. The second lens unit G2 while drawing a locus that is convex toward an image side, and the second lens unit is arranged slightly closer to the object side in a telephoto end than in the wide-angle end. The aperture stop S and the third lens unit G3 integrally move toward the object side. The fourth lens unit G4 draws a locus that is convex toward the image side, and moves while expanding a space between the fourth lens unit and the third lens unit G3, and the fourth lens unit is disposed slightly closer to the object side in a telephoto end than in the wide-angle end.

The first lens unit G1 includes a cemented lens of a negative meniscus lens which directs its convex surface on the object side and a positive meniscus lens which directs its convex surface on the object side in order from the object side. The second lens unit G2 includes, in order from the object side, a negative meniscus lens which directs its convex surface on the object side, a double-concave negative lens, and a double-convex positive lens. The third lens unit G3 includes, in order from the object side, two double-convex positive lenses, and a negative meniscus lens which directs its convex surface on the object side. The fourth lens unit G4 includes a positive meniscus lens which directs convex surface on the image side.

Aspherical surfaces are used in four surfaces: opposite surfaces of the double-convex positive lens on the object side in the third lens unit G3; and opposite surfaces of the positive meniscus lens of the fourth lens unit G4.

Figure 5A:
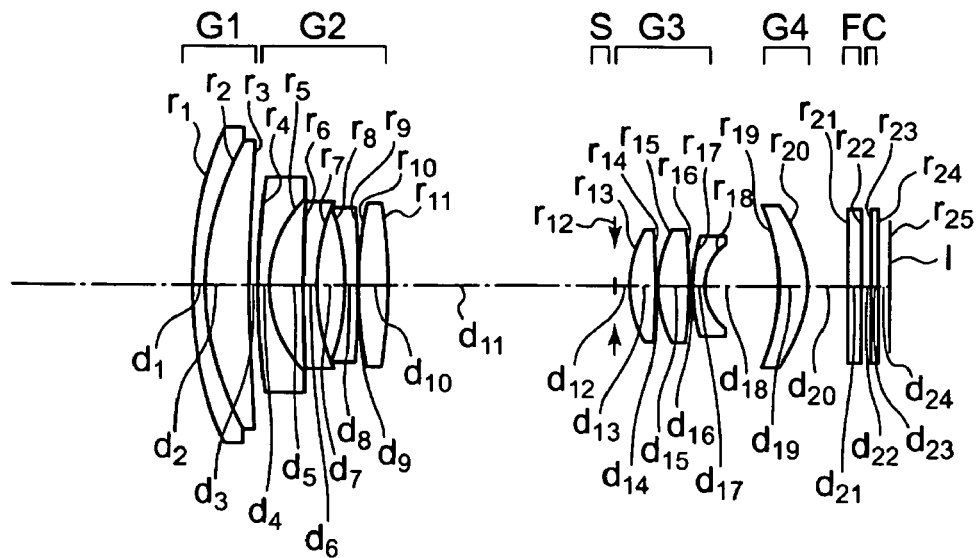
FIGS. 5A to 5C are sectional views of a zoom lens system for use in a image taking apparatus of the present invention along a plane including an optical axis in Example 5.
Figure 5B:
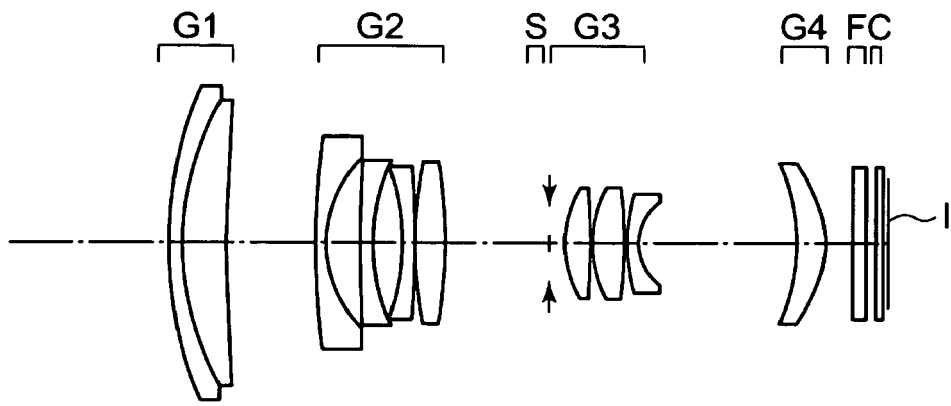
Figure 5C:
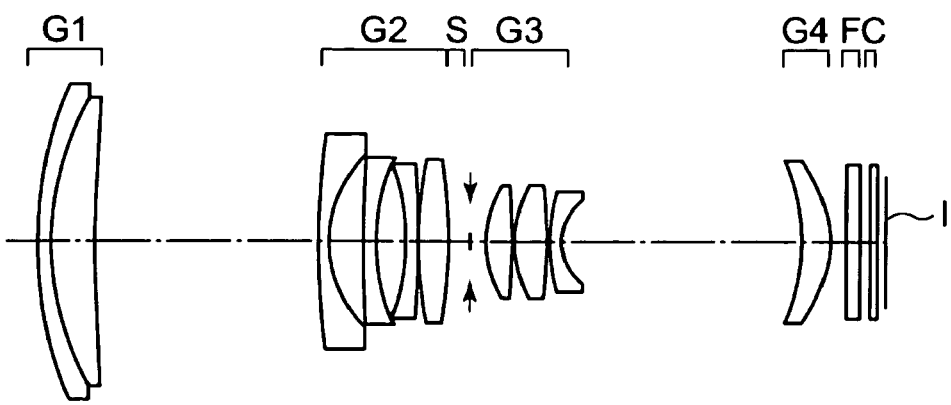
Figure 6A:
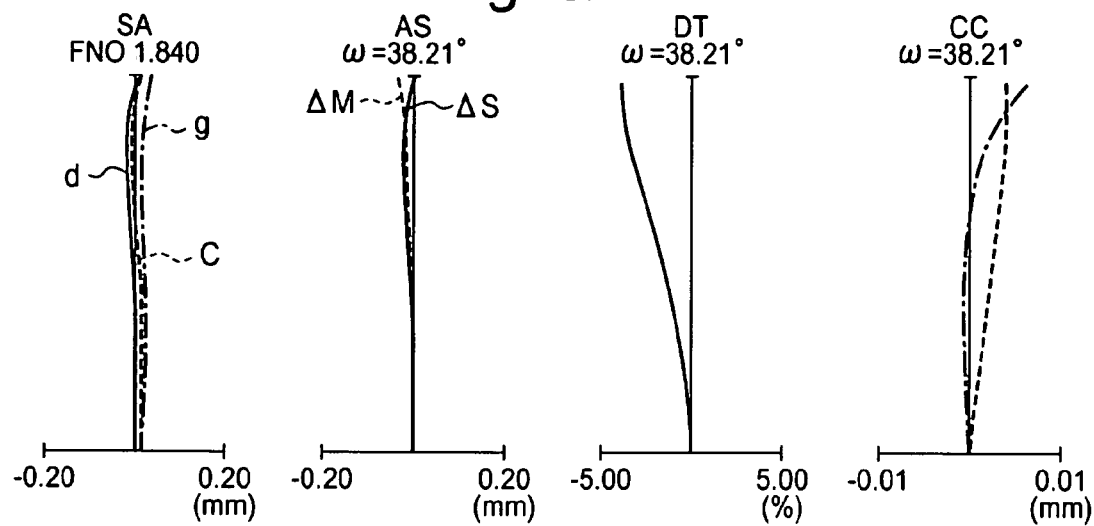
FIGS. 6A to 6C are aberration diagrams during focusing on an infinite object in Example 1.
Figure 6B:
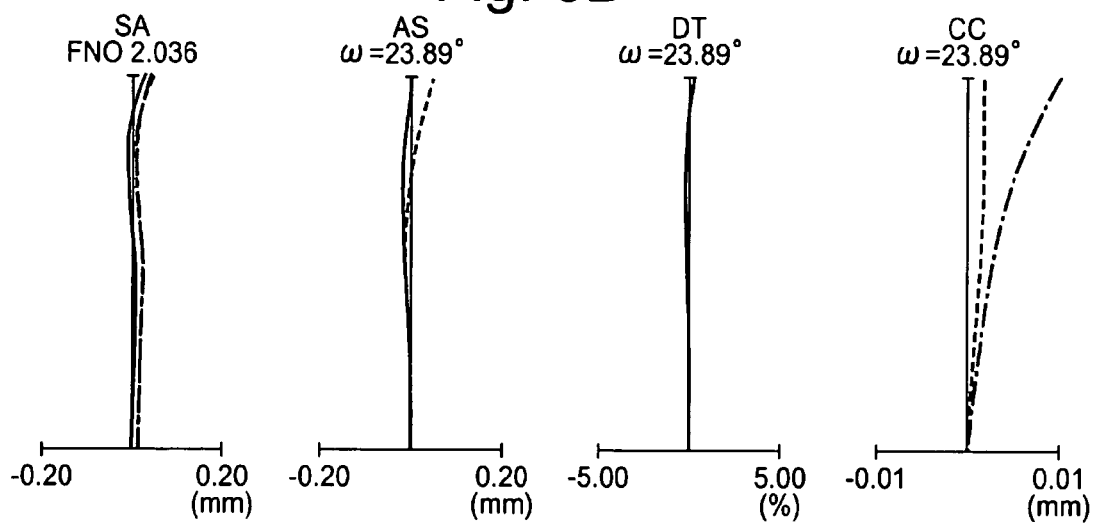
Figure 6C:
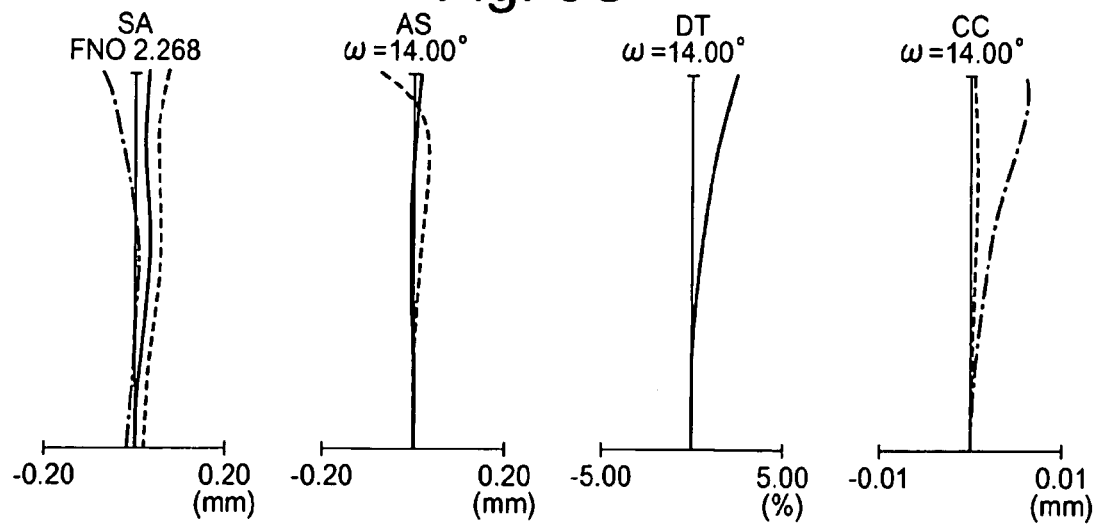
Figure 7A:
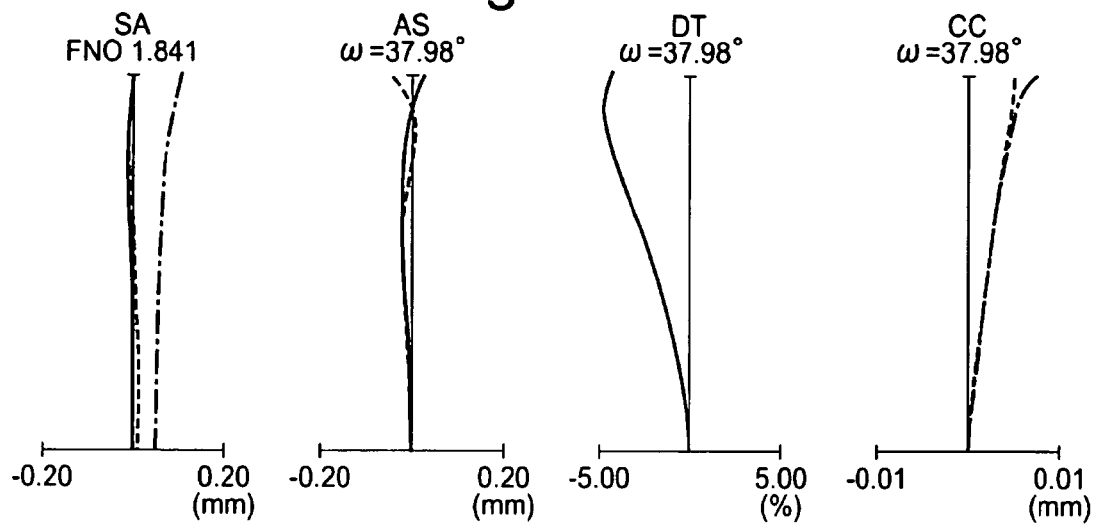
FIGS. 7A to 7C are aberration diagrams during focusing on an infinite object in Example 2.
Figure 7B:
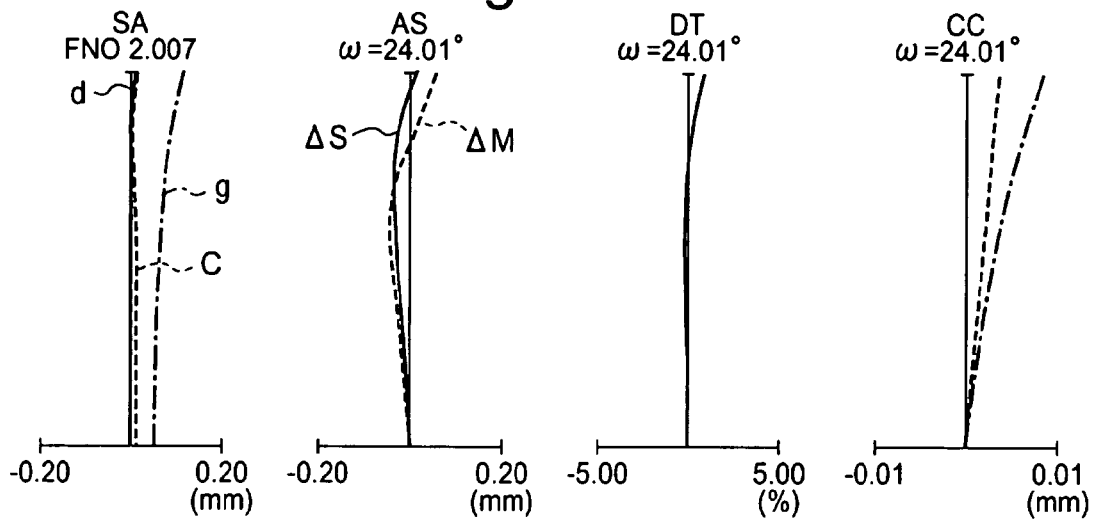
Figure 7C:
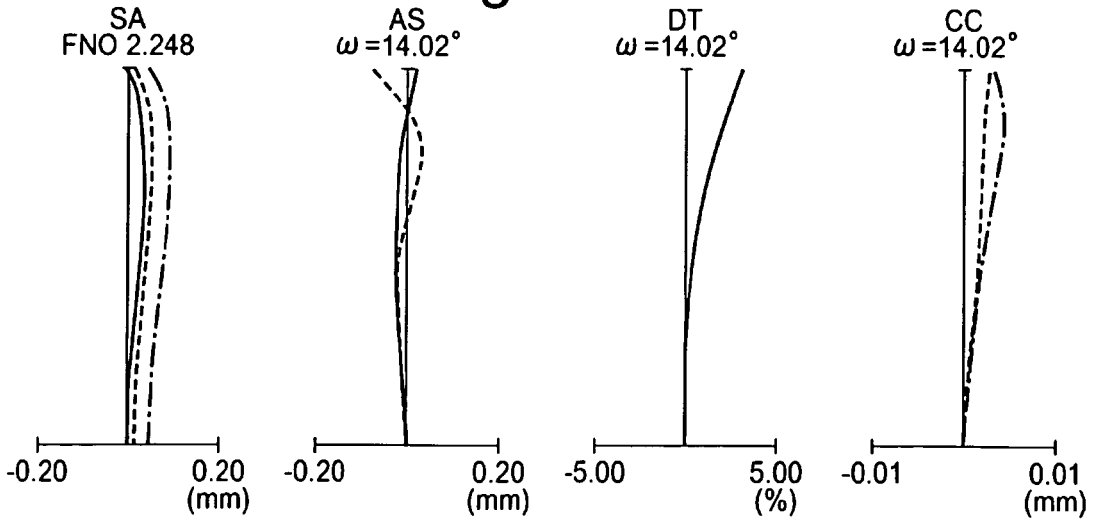
Figure 8A:
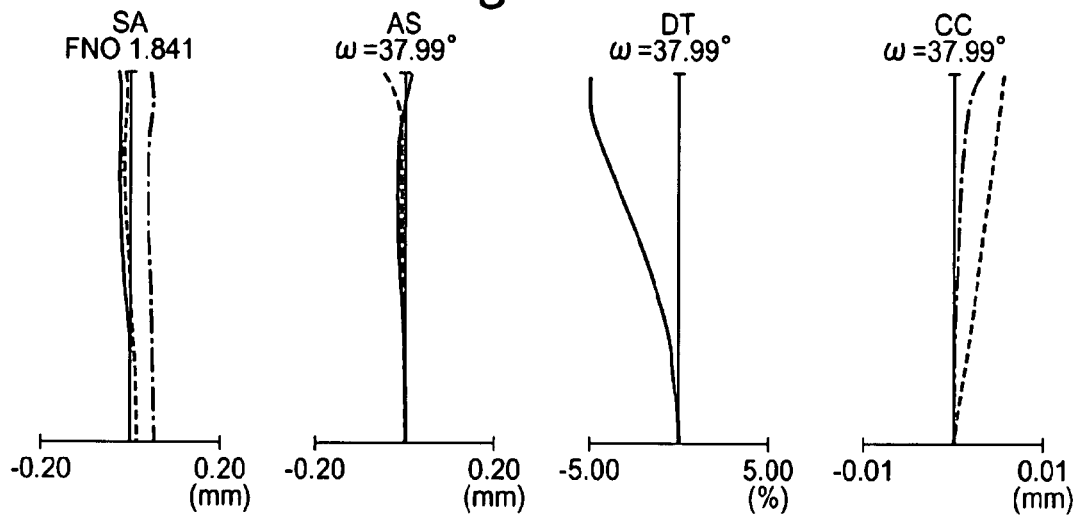
FIGS. 8A to 8C are aberration diagrams during focusing on an infinite object in Example 3.
Figure 8B:
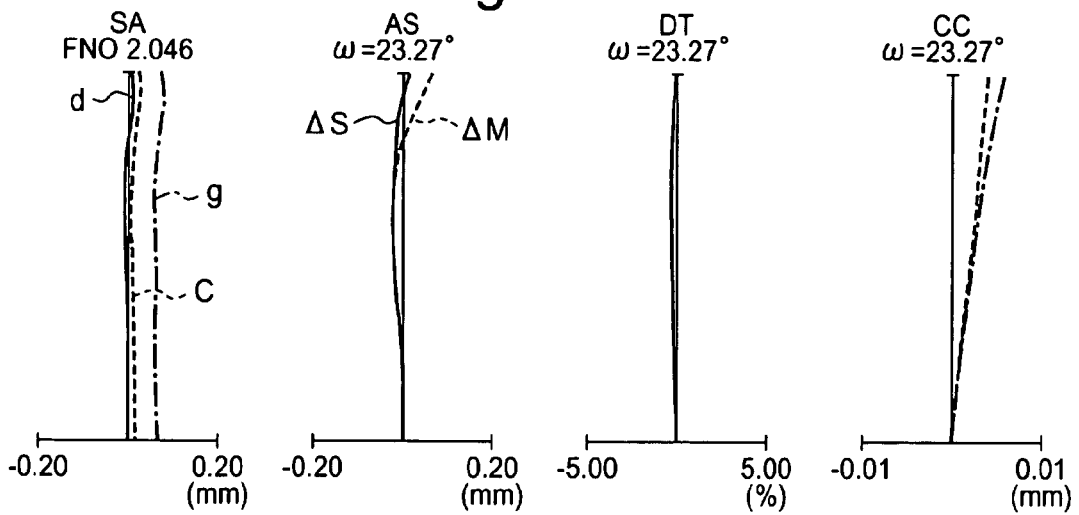
Figure 8C:
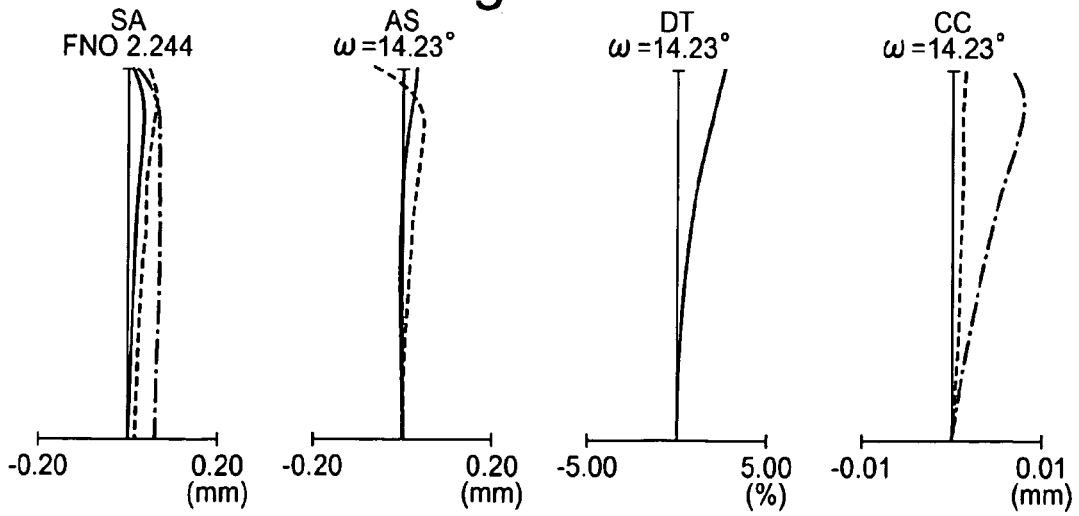
Figure 9A:
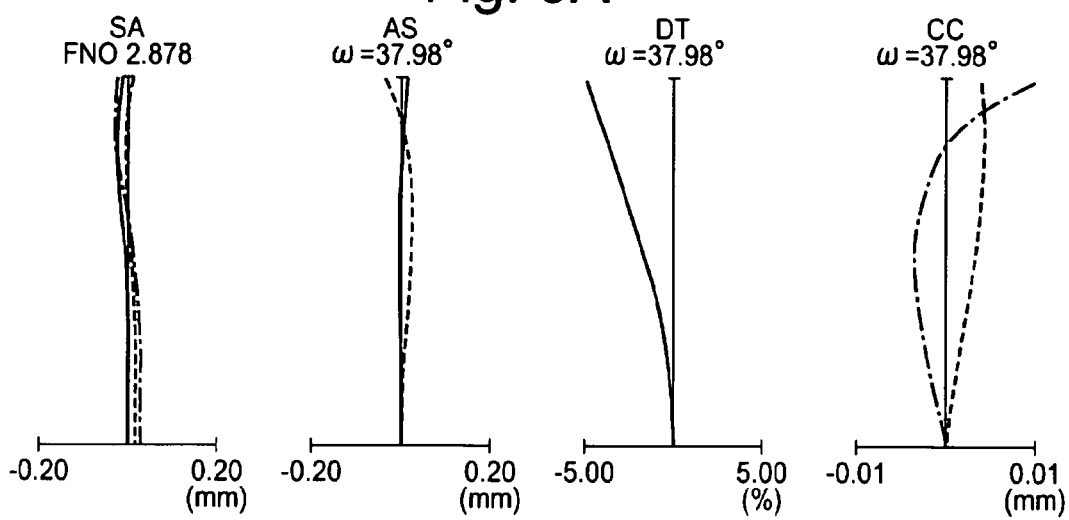
FIGS. 9A to 9C are aberration diagrams during focusing on an infinite object in Example 4.
Figure 9B:
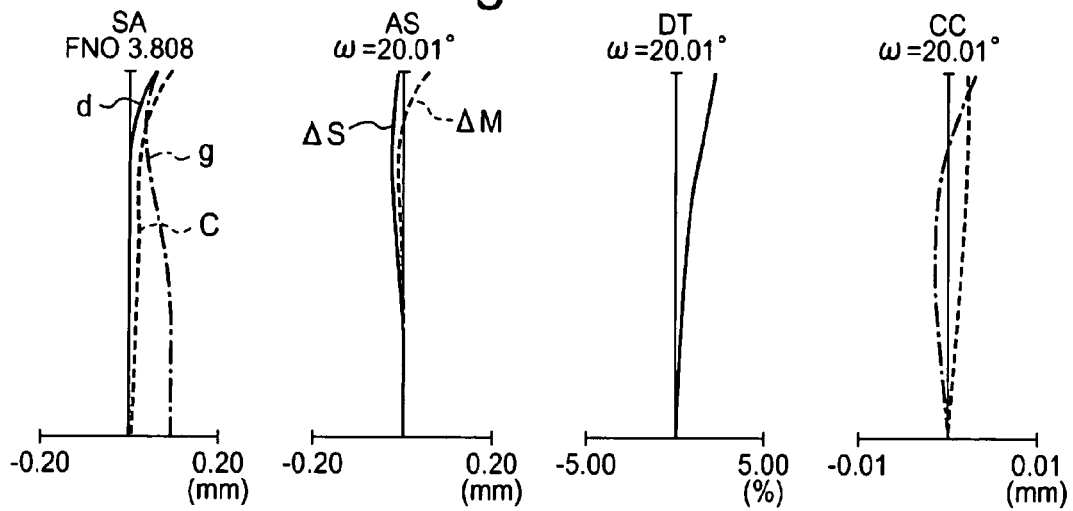
Figure 9C:
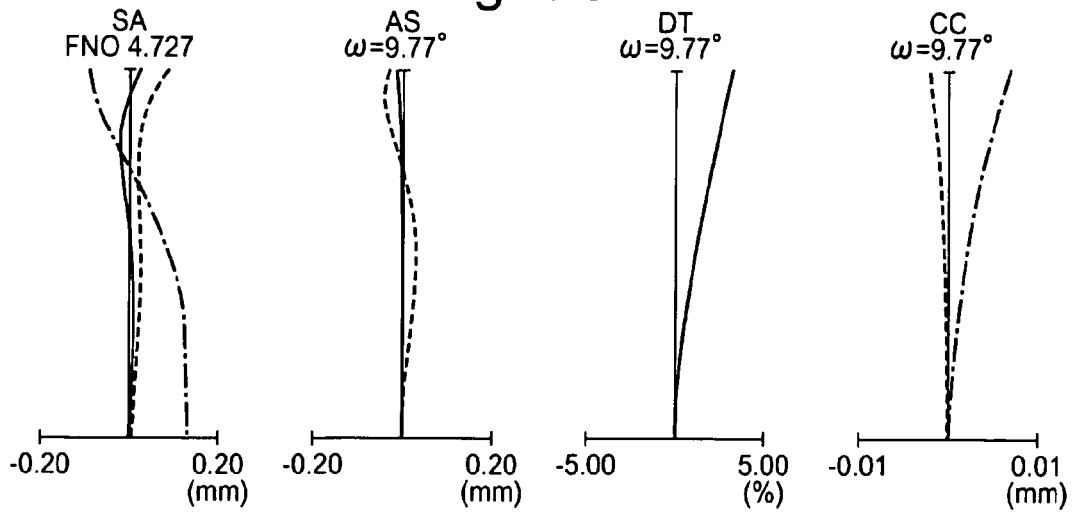
Figure 10A:
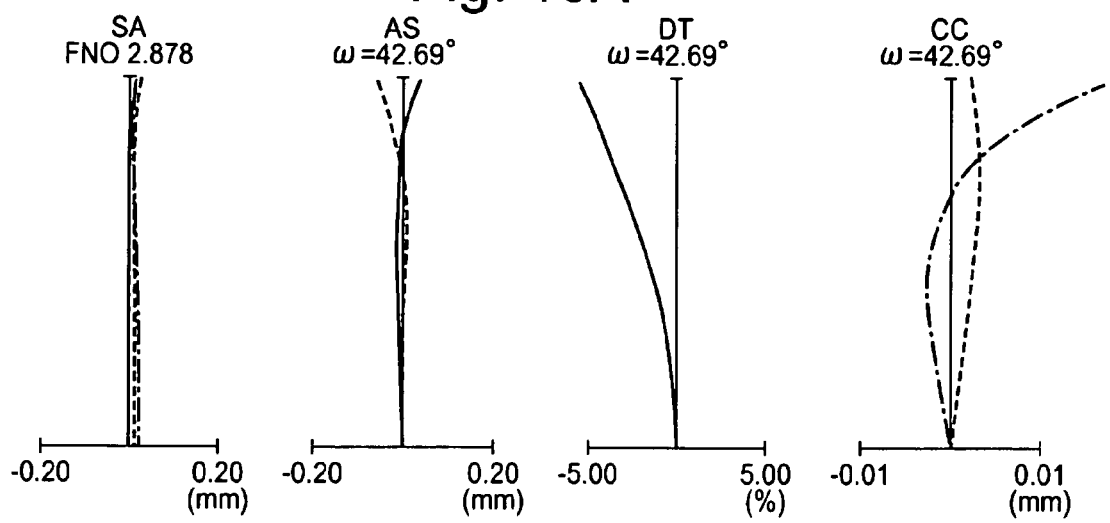
FIGS. 10A to 10C are aberration diagrams during focusing on an infinite object in Example 5.
Figure 10B:
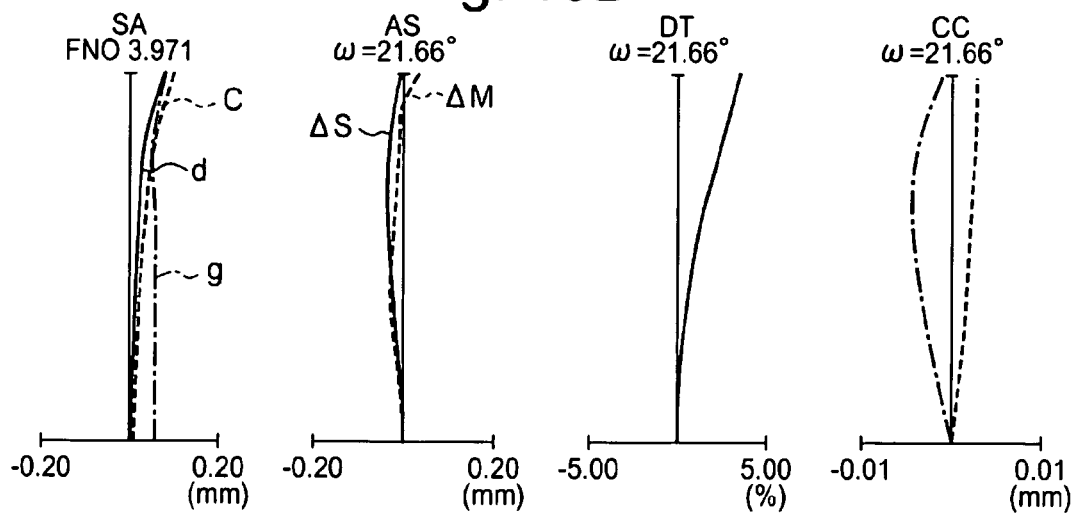
Figure 10C:
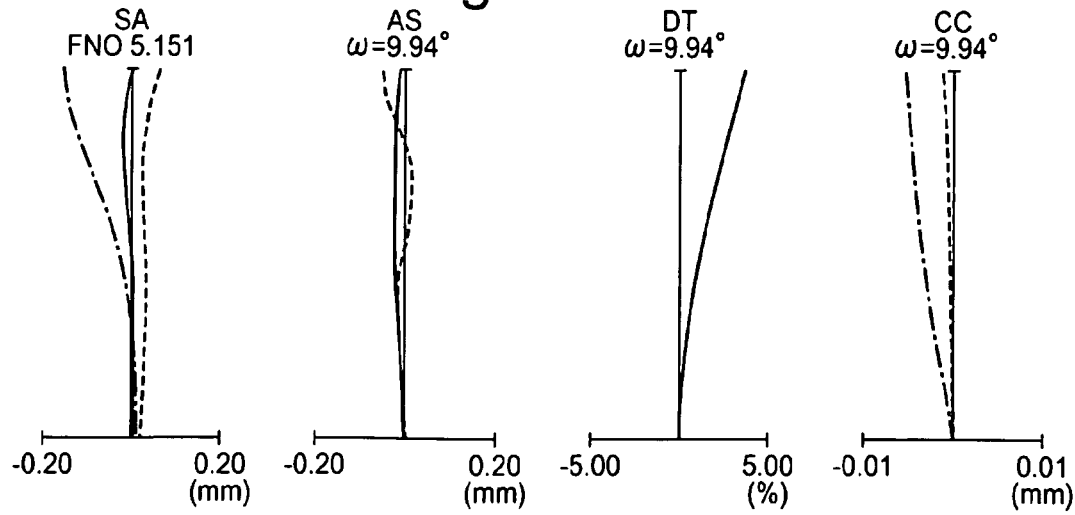

In Example 5, as shown in FIGS. 5A to 5C, the zoom lens system includes, in order from an object side, a first lens unit G1 having a positive refractive power, a second lens unit G2 having a negative refractive power, an aperture stop S, a third lens unit G3 having a positive refractive power, and a fourth lens unit G4 having a positive refractive power. During zooming from a wide-angle end to a telephoto end, the first lens unit G1 moves toward the object side, the second lens unit moves toward an image side, the aperture stop S and the third lens unit G3 integrally move toward the object side, and the fourth lens unit G4 moves while expanding a space between the fourth lens unit and the third lens unit G3.

The first lens unit G1 includes a cemented lens of a negative meniscus lens which directs its convex surface on the object side and a positive meniscus lens which directs its convex surface on the object side in order from the object side. The second lens unit G2 includes, in order from the object side, a negative meniscus lens which directs its convex surface on the object side, a double-concave negative lens, a negative meniscus lens which directs its convex surface on the image side, and a double-convex positive lens. The third lens unit G3 includes, in order from the object side, two double-convex positive lenses, and a negative meniscus lens which directs its convex surface on the object side. The fourth lens unit G4 includes a positive meniscus lens which directs convex surface on the image side.

Aspherical surfaces are used in four surfaces: opposite surfaces of the double-convex positive lens on the object side in the third lens unit G3; and opposite surfaces of the positive meniscus lens of the fourth lens unit G4.

Numerical data of the above examples will be described hereinafter. In data tables, f denotes a focal length of the zoom lens system; FNO denotes the F number; ω denotes a half angle of view; WE denotes a wide-angle end; ST denotes an intermediate focal length state; TE denotes a telephoto end; r1, r2 . . . denote a radius of curvature of each lens surface; d1, d2 . . . denote a space between the lens surfaces; nd1, nd2 . . . denote a refractive index for the d-line of each lens; and Vd1, Vd2 . . . denote the Abbe number of each lens. It is to be noted that in a coordinate system in which an x-axis is matched with an optical axis, a light travel direction is positive, and a y-axis extends in a direction crossing the optical axis at right angles, an aspherical surface shape is represented in by the following equation.

$$x = (y^2/r)/[1+\{1-(K+1)(y/r)^2\}^{1/2}] + A4 \cdot y^4 + A6 \cdot y^6 + A8 \cdot y^8 + A10 \cdot y^{10},$$

wherein r denotes a paraxial radius of curvature, K denotes a conical coefficient, and A4, A6, A8, and A10 denote 4th-order, 6th-order, 8th-order, and 10th-order aspherical coefficients, respectively.

Moreover, "E-5" or the like in the data of each example means multiplying by a power of 10. Therefore, for example, an aspherical coefficient A4 of the surface r12 in Example 1 is described as −1.51770E-4, but this means $-1.51770 \times 10^{-4}$.

EXAMPLE 1

TABLE 1

| r | d | nd | Vd |
|---|---|----|----|
| r1 = 22.826 | d1 = 4.58 | nd1 = 1.51633 | Vd1 = 64.14 |
| r2 = 112.202 | d2 = variable | | |
| r3 = 28.599 | d3 = 1.40 | nd2 = 1.88300 | Vd2 = 40.76 |
| r4 = 8.027 | d4 = 2.96 | | |
| r5 = 45.690 | d5 = 1.20 | nd3 = 1.83400 | Vd3 = 37.16 |
| r6 = 11.957 | d6 = 1.95 | | |
| r7 = −40.545 | d7 = 1.30 | nd4 = 1.83400 | Vd4 = 37.16 |
| r8 = 77.198 | d8 = 0.80 | | |
| r9 = 21.082 | d9 = 2.50 | nd5 = 1.92286 | Vd5 = 20.88 |
| r10 = −202.956 | d10 = variable | | |
| r11 = ∞ (Aperture stop) | d11 = 1.00 | | |
| r12 = 13.634* | d12 = 3.00 | nd6 = 1.74330 | Vd6 = 49.33 |
| r13 = −34.940* | d13 = 0.30 | | |
| r14 = 9.995 | d14 = 3.50 | nd7 = 1.49700 | Vd7 = 81.54 |
| r15 = −16.522 | d15 = 0.32 | | |
| r16 = −78.441 | d16 = 0.86 | nd8 = 1.84666 | Vd8 = 23.78 |
| r17 = 6.416 | d17 = variable | | |
| r18 = 15.271* | d18 = 3.00 | nd9 = 1.80610 | Vd9 = 40.92 |
| r19 = −52.723* | d19 = variable | | |
| r20 = ∞ | d20 = 0.95 | nd10 = 1.54771 | Vd10 = 62.84 |
| r21 = ∞ | d21 = 0.60 | | |
| r22 = ∞ | d22 = 0.50 | nd11 = 1.51633 | Vd11 = 64.14 |
| r23 = ∞ | d23 = 1.00 | | |
| r24 = ∞ (Image surface) | | | |

*Aspherical Surface

TABLE 2

Aspherical coefficients

| Surface | K | A4 | A6 | A8 | A10 |
|---|---|---|---|---|---|
| r12 | −0.175 | −1.51770E−4 | −1.22059E−6 | −6.00570E−8 | 0 |
| r13 | −1.273 | 2.22054E−5 | −1.32154E−6 | −1.69221E−8 | 0 |
| r18 | −1.323 | 6.11593E−5 | 2.76946E−6 | −4.80254E−9 | 1.01832E−10 |
| r19 | −50.000 | 5.57112E−5 | 3.38998E−6 | 0 | 0 |

TABLE 3

Zoom Data (∞)

|  | WE | ST | TE |
|---|---|---|---|
| f (mm) | 5.967 | 10.171 | 17.687 |
| FNO | 1.84 | 2.04 | 2.27 |
| ω(°) | 38.21 | 23.89 | 14.00 |
| d2 | 1.00 | 7.66 | 15.98 |
| d10 | 15.23 | 6.57 | 1.50 |
| d17 | 3.79 | 4.38 | 8.22 |
| d19 | 4.70 | 6.86 | 8.72 |

EXAMPLE 2

TABLE 4

| r | d | nd | Vd |
|---|---|---|---|
| r1 = 24.743 | d1 = 4.80 | nd1 = 1.49700 | Vd1 = 81.54 |
| r2 = 237.149 | d2 = variable | | |
| r3 = 29.187 | d3 = 1.40 | nd2 = 2.00330 | Vd2 = 28.27 |
| r4 = 7.467 | d4 = 3.91 | | |
| r5 = −32.614 | d5 = 1.30 | nd3 = 1.77250 | Vd3 = 49.60 |
| r6 = 16.610 | d6 = 0.34 | | |
| r7 = 14.576 | d7 = 2.60 | nd4 = 1.92286 | Vd4 = 20.88 |
| r8 = −202.956 | d8 = variable | | |
| r9 = ∞ (Aperture Stop) | d9 = 1.00 | | |
| r10 = 11.593* | d10 = 3.00 | nd5 = 1.80610 | Vd5 = 40.73 |
| r11 = −35.595* | d11 = 0.30 | | |
| r12 = 9.122 | d12 = 3.30 | nd6 = 1.77250 | Vd6 = 49.60 |
| r13 = −19.178 | d13 = 0.86 | nd7 = 1.92286 | Vd7 = 20.88 |
| r14 = 5.461 | d14 = variable | | |
| r15 = 12.339* | d15 = 3.00 | nd8 = 1.81474 | Vd8 = 37.03 |
| r16 = −78.327* | d16 = variable | | |
| r17 = ∞ | d17 = 0.95 | nd9 = 1.54771 | Vd9 = 62.84 |
| r18 = ∞ | d18 = 0.60 | | |
| r19 = ∞ | d19 = 0.50 | nd10 = 1.51633 | Vd10 = 64.14 |
| r20 = ∞ | d20 = 1.00 | | |
| r21 = ∞ (Image surface) | | | |

*Aspherical Surface

TABLE 5

Aspherical coefficients

| Surface | K | A4 | A6 | A8 | A10 |
|---|---|---|---|---|---|
| r10 | −0.745 | −7.12068E−5 | −2.50846E−7 | −9.36369E−8 | 0 |
| r11 | −6.961 | −4.69818E−5 | −9.69203E−7 | −7.71201E−8 | 0 |
| r15 | 2.346 | −1.80684E−4 | −4.97044E−6 | 1.84910E−7 | −4.67999E−9 |
| r16 | −50.000 | 5.67250E−5 | 7.71481E−7 | 1.45774E−8 | 0 |

TABLE 6

Zoom Data (∞)

|  | WE | ST | TE |
|---|---|---|---|
| f (mm) | 6.036 | 10.036 | 17.569 |
| FNO | 1.84 | 2.01 | 2.25 |
| ω(°) | 37.98 | 24.01 | 14.02 |
| d2 | 1.00 | 7.78 | 16.27 |
| d8 | 14.72 | 6.60 | 1.48 |
| d14 | 4.00 | 4.41 | 6.92 |
| d16 | 2.40 | 3.95 | 5.15 |

EXAMPLE 3

TABLE 7

| r | d | nd | Vd |
|---|---|---|---|
| r1 = 23.793 | d1 = 4.80 | nd1 = 1.48749 | Vd1 = 70.23 |
| r2 = 172.819 | d2 = variable | | |
| r3 = 28.340 | d3 = 1.30 | nd2 = 1.90366 | Vd2 = 31.31 |
| r4 = 7.773 | d4 = 3.48 | | |
| r5 = −78.545 | d5 = 1.00 | nd3 = 1.81600 | Vd3 = 46.62 |
| r6 = 16.610 | d6 = 1.54 | | |
| r7 = 15.956 | d7 = 2.60 | nd4 = 1.92286 | Vd4 = 18.90 |
| r8 = 73.792 | d8 = variable | | |
| r9 = ∞ (Aperture Stop) | d9 = 1.00 | | |
| r10 = 12.637* | d10 = 3.00 | nd5 = 1.80610 | Vd5 = 40.73 |
| r11 = −33.558* | d11 = 0.30 | | |
| r12 = 9.979 | d12 = 3.30 | nd6 = 1.77250 | Vd6 = 49.60 |
| r13 = −102.518 | d13 = 0.90 | nd7 = 1.92286 | Vd7 = 18.90 |
| r14 = 5.866 | d14 = variable | | |
| r15 = 12.579* | d15 = 3.00 | nd8 = 1.81474 | Vd8 = 37.03 |
| r16 = −79.820* | d16 = variable | | |
| r17 = ∞ | d17 = 0.95 | nd9 = 1.54771 | Vd9 = 62.84 |
| r18 = ∞ | d18 = 0.60 | | |
| r19 = ∞ | d19 = 0.50 | nd10 = 1.51633 | Vd10 = 64.14 |
| r20 = ∞ | d20 = 1.01 | | |
| r21 = ∞ (Image surface) | | | |

*Aspherical Surface

TABLE 8

Aspherical coefficients

| Surface | K | A4 | A6 | A8 | A10 |
|---|---|---|---|---|---|
| r10 | −0.338 | −1.67760E−4 | −1.01067E−6 | −1.54472E−7 | 0 |
| r11 | −14.065 | −1.47944E−4 | −1.16748E−6 | −1.26121E−7 | 0 |
| r15 | 2.162 | −1.39058E−4 | −9.02918E−8 | 6.40694E−8 | −1.98927E−9 |
| r16 | −38.549 | 1.29933E−4 | 8.03738E−7 | 1.70648E−7 | −2.88993E−9 |

TABLE 9

Zoom Data (∞)

| | WE | ST | TE |
|---|---|---|---|
| f (mm) | 6.077 | 10.502 | 17.355 |
| FNO | 1.84 | 2.05 | 2.24 |
| ω(°) | 37.99 | 23.27 | 14.23 |
| d2 | 1.00 | 7.48 | 16.09 |
| d8 | 14.52 | 5.69 | 1.64 |
| d14 | 3.75 | 4.43 | 7.16 |
| d16 | 3.28 | 5.18 | 6.19 |

TABLE 12

Zoom Data (∞)

| | WE | ST | TE |
|---|---|---|---|
| f (mm) | 6.077 | 12.125 | 25.440 |
| FNO | 2.88 | 3.81 | 4.73 |
| ω(°) | 37.98 | 20.01 | 9.77 |
| d4 | 0.80 | 7.58 | 17.47 |
| d10 | 16.77 | 8.74 | 2.72 |
| d17 | 5.86 | 11.58 | 16.79 |
| d19 | 2.85 | 2.00 | 2.91 |

EXAMPLE 4

TABLE 10

| r | d | nd | Vd |
|---|---|---|---|
| r1 = 31.079 | d1 = 1.00 | nd1 = 1.92286 | Vd1 = 20.88 |
| r2 = 22.683 | d2 = 0.01 | nd2 = 1.56384 | Vd2 = 60.67 |
| r3 = 22.683 | d3 = 3.30 | nd3 = 1.83481 | Vd3 = 42.71 |
| r4 = 105.363 | d4 = variable | | |
| r5 = 41.865 | d5 = 0.90 | nd4 = 2.00330 | Vd4 = 28.27 |
| r6 = 7.769 | d6 = 3.31 | | |
| r7 = −17.113 | d7 = 0.85 | nd5 = 1.83481 | Vd5 = 42.71 |
| r8 = 25.611 | d8 = 0.82 | | |
| r9 = 19.784 | d9 = 2.20 | nd6 = 1.92286 | Vd6 = 20.88 |
| r10 = −39.912 | d10 = variable | | |
| r11 = ∞ (Aperture stop) | d11 = 1.00 | | |
| r12 = 7.079* | d12 = 2.00 | nd7 = 1.58313 | Vd7 = 59.46 |
| r13 = −52.845* | d13 = 0.20 | | |
| r14 = 8.260 | d14 = 2.30 | nd8 = 1.48749 | Vd8 = 70.23 |
| r15 = −59.428 | d15 = 0.21 | | |
| r16 = 12.089 | d16 = 0.80 | nd9 = 1.84666 | Vd9 = 23.78 |
| r17 = 4.050 | d17 = variable | | |
| r18 = −35.202* | d18 = 2.30 | nd10 = 1.58313 | Vd10 = 59.46 |
| r19 = −8.936* | d19 = variable | | |
| r20 = ∞ | d20 = 0.95 | nd11 = 1.54771 | Vd11 = 62.84 |
| r21 = ∞ | d21 = 0.60 | | |
| r22 = ∞ | d22 = 0.50 | nd12 = 1.51633 | Vd12 = 64.14 |
| r23 = ∞ | d23 = 0.99 | | |
| r24 = ∞ (Image surface) | | | |

*Aspherical Surface

EXAMPLE 5

TABLE 13

| r | d | nd | Vd |
|---|---|---|---|
| r1 = 24.707 | d1 = 1.00 | nd1 = 1.92286 | Vd1 = 20.88 |
| r2 = 18.015 | d2 = 3.30 | nd2 = 1.83481 | Vd2 = 42.71 |
| r3 = 60.544 | d3 = variable | | |
| r4 = 57.833 | d4 = 0.90 | nd3 = 2.00330 | Vd3 = 28.27 |
| r5 = 8.459 | d5 = 2.48 | | |
| r6 = −618.227 | d6 = 0.85 | nd4 = 1.83481 | Vd4 = 42.71 |
| r7 = 15.900 | d7 = 2.00 | | |
| r8 = −15.536 | d8 = 0.80 | nd5 = 1.83481 | Vd5 = 42.71 |
| r9 = −100.493 | d9 = 0.10 | | |
| r10 = 27.850 | d10 = 2.20 | nd6 = 1.92286 | Vd6 = 20.88 |
| r11 = −23.473 | d11 = variable | | |
| r12 = ∞ (Aperture stop) | d12 = 1.00 | | |
| r13 = 6.635* | d13 = 2.00 | nd7 = 1.51633 | Vd7 = 64.14 |
| r14 = −54.631* | d14 = 0.20 | | |
| r15 = 8.049 | d15 = 2.30 | nd8 = 1.49700 | Vd8 = 81.54 |
| r16 = −45.221 | d16 = 0.21 | | |
| r17 = 10.405 | d17 = 0.80 | nd9 = 1.84666 | Vd9 = 23.78 |
| r18 = 3.971 | d18 = variable | | |
| r19 = −22.577* | d19 = 2.30 | nd10 = 1.58313 | Vd10 = 59.46 |
| r20 = −7.318* | d20 = variable | | |
| r21 = ∞ | d21 = 0.95 | nd11 = 1.54771 | Vd11 = 62.84 |
| r22 = ∞ | d22 = 0.60 | | |
| r23 = ∞ | d23 = 0.50 | nd12 = 1.51633 | Vd12 = 64.14 |
| r24 = ∞ | d24 = 0.99 | | |
| r25 = ∞ (Image surface) | | | |

*Aspherical Surface

TABLE 11

Aspherical coefficients

| Surface | K | A4 | A6 | A8 | A10 |
|---|---|---|---|---|---|
| 12 | −0.184 | −2.68124E−4 | 1.18191E−5 | −6.84159E−7 | 3.41100E−8 |
| 13 | 54.834 | 3.00332E−4 | 1.32075E−5 | −4.52900E−7 | 3.02400E−8 |
| 18 | 0.000 | −1.83055E−4 | 2.30180E−6 | 4.11592E−8 | 0 |
| 19 | 0.000 | 1.93838E−4 | −2.54879E−6 | 8.28627E−8 | 7.54300E−10 |

TABLE 14

| | Aspherical coefficients | | | | |
|---|---|---|---|---|---|
| Surface | K | A4 | A6 | A8 | A10 |
| r13 | −0.140 | −3.58156E−4 | 8.05105E−6 | −7.18267E−7 | 3.41100E−8 |
| r14 | 35.123 | 3.46111E−4 | 9.71315E−6 | −4.52900E−7 | 3.02400E−8 |
| r19 | 0.000 | −2.45198E−4 | −2.66338E−5 | 8.12480E−7 | 0 |
| r20 | 0.000 | 5.72566E−4 | −1.60688E−5 | −6.28136E−10 | 1.30159E−8 |

TABLE 15

| | Zoom Data (∞) | | |
|---|---|---|---|
| | WE | ST | TE |
| f (mm) | 5.176 | 10.986 | 24.805 |
| FNO | 2.88 | 3.97 | 5.15 |
| ω(°) | 42.69 | 21.66 | 9.94 |
| d3 | 0.80 | 6.59 | 16.50 |
| d11 | 16.53 | 7.48 | 1.63 |
| d18 | 5.12 | 11.35 | 17.13 |
| d20 | 2.56 | 1.21 | 0.67 |

FIGS. 6A to 10C show aberration diagrams at a time when zoom lens systems are focused on an infinite object in Examples 1 to 5. FIGS. 6A, 7A, 8A, 9A, and 10A show aberrations in wide-angle ends, FIGS. 6B, 7B, 8B, 9B, and 10B show aberrations of intermediate focal length states, and FIGS. 6C, 7C, 8C, 9C, and 10C show aberrations in telephoto ends. In each drawing, SA denotes a spherical aberration, AS denotes an astigmatism, DT denotes distortion, and CC denotes a chromatic aberration of magnification.

Values of conditions (A), and (1) to (9) of Examples 1 to 5 described above are as follows.

TABLE 16

| | Example | | | | |
|---|---|---|---|---|---|
| Condition | 1 | 2 | 3 | 4 | 5 |
| (A) | 0.71 | 0.64 | 0.65 | 0.57 | 0.71 |
| (1) | 0.85 | 0.86 | 0.88 | 1.64 | 2.53 |
| (2) | 2.51 | 2.20 | 2.23 | 3.27 | 3.40 |
| (3) | 0.97 | 1.08 | 1.08 | 1.07 | 1.00 |
| (4) | 4.28 | 3.93 | 4.14 | 3.03 | 3.42 |
| (5) | 5.61 | 5.11 | 5.29 | 5.44 | 5.37 |
| (6) | 1.05 | 0.99 | 1.04 | 0.63 | 0.69 |
| (7) | 0.46 | 0.39 | 0.41 | 0.66 | 0.69 |
| (8) | 1.65 | 1.76 | 1.67 | 1.66 | 1.63 |
| (9) | 1.52 | 1.65 | 1.56 | 1.57 | 1.54 |

In each of the above examples, the zoom lens system achieves a wide angle of view in excess of 72° in the wide-angle end. Especially in Examples 1 to 3, the F number is small in the wide-angle end, and a large aperture ratio is achieved. Especially in Examples 4, 5, a high zooming ratio is achieved. In any of the examples, various aberrations are satisfactorily corrected. Each example has a high image forming performance, and miniaturization is achieved.

The above-described zoom lens system is broadly applied to various types of image taking apparatuses such as a lens integral type digital camera, a digital camera whose lens is changeable, a video camera, and a monitor camera.

Next, there will be described an embodiment of an image taking apparatus to which the above-described zoom lens system is applicable.

This example is a digital camera including a zoom lens system as a photographing optical system. In the camera, an object image is formed by the zoom lens system, and the image is received by an image sensor such as a CCD to perform the photographing.

Figure 11:
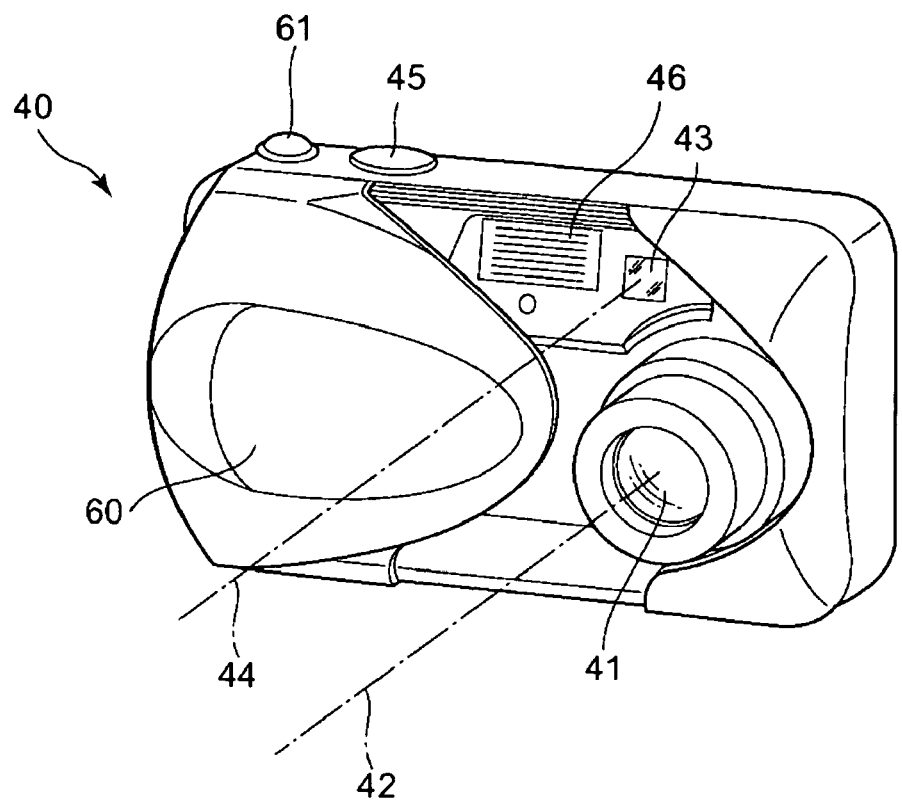
FIG. 11 is a front perspective view showing an appearance of an embodiment of the image taking apparatus of the present invention.
Figure 12:
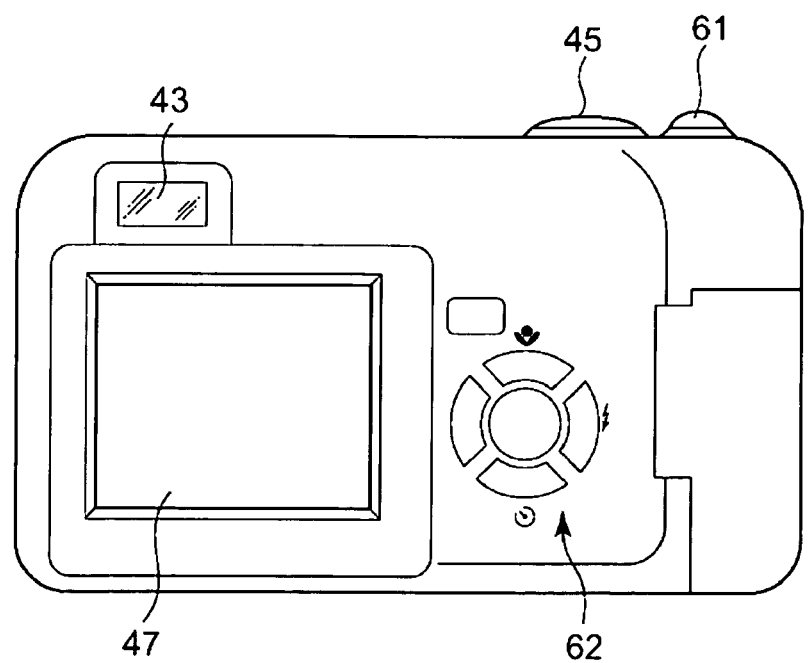
FIG. 12 is a rear view of the embodiment shown in FIG. 11.
Figure 13:
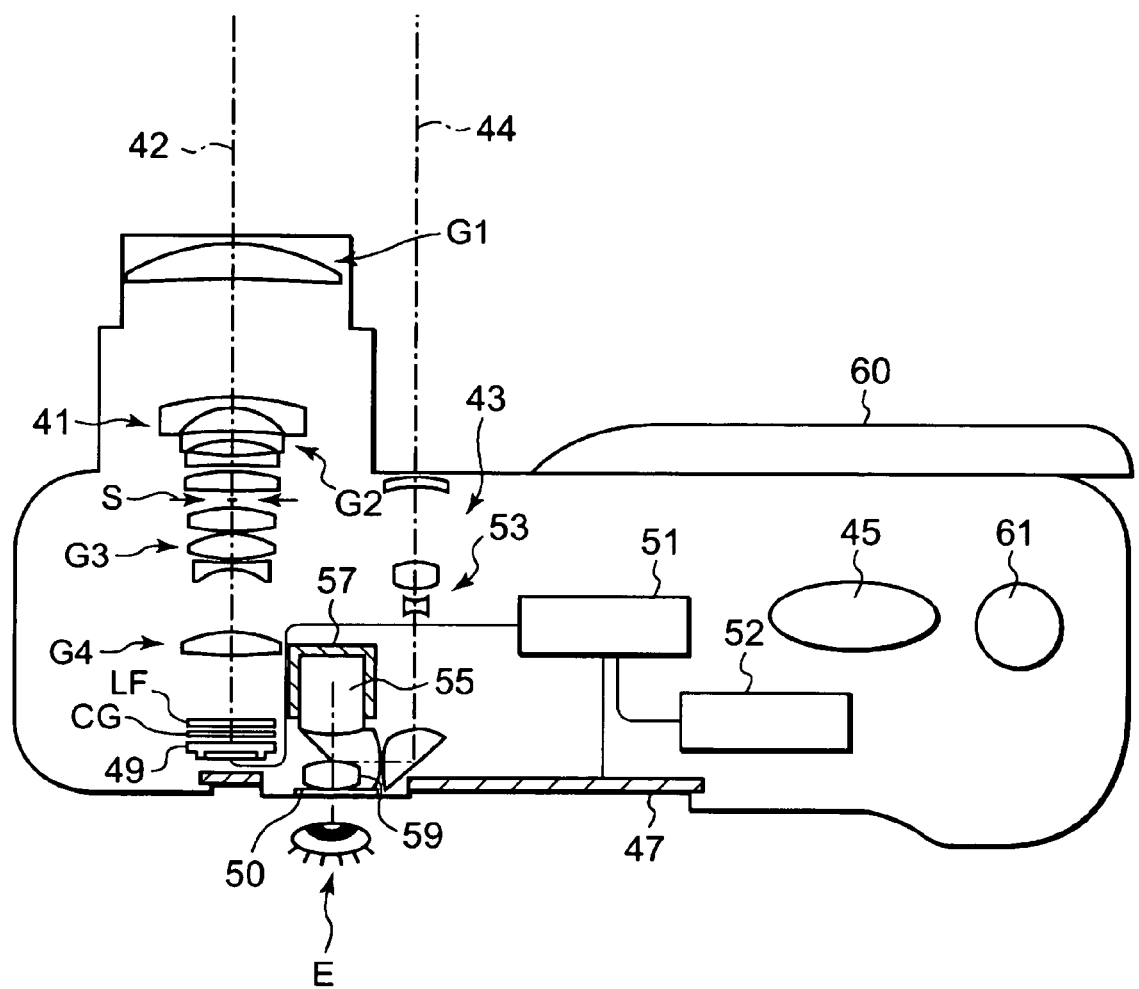
FIG. 13 is a schematic sectional view of the embodiment shown in FIG. 11.

FIG. 11 is a front perspective view showing an appearance of a digital camera 40, FIG. 12 is a back view of the digital camera 40, and FIG. 13 is a schematic sectional view showing an inner constitution of the digital camera 40. FIGS. 11 and 13 show a non-collapsed state of a photographing optical system 41. In this example, the digital camera 40 includes the photographing optical system 41 having an optical path 42 for photographing, a finder optical system 43 having an optical path 44 for a finder, a shutter button 45, a flash 46, a liquid crystal display monitor 47, a focal length change button 61, a setting change switch 62 and the like. In a collapsed state of the photographing optical system 41, when a cover 60 is slid, the photographing optical system 41, the finder optical system 43, and the flash 46 are covered with the cover 60. Moreover, when the cover 60 is opened to bring the camera 40 into a photographing state, the photographing optical system 41 becomes the non-collapsed state of FIG. 13. When the shutter button 45 disposed in an upper part of the camera 40 is pressed, the photographing is performed by the photographing optical system 41, for example, through the zoom lens system of Example 1 in conjunction with the pressed button. An object image formed by the photographing optical system 41 is formed on an image pickup surface of the CCD 49 via a low pass filter LF coated with an IR cutting coating and cover glass CG. The object image received by the CCD 49 is displayed as an electronic image in the liquid crystal display monitor 47 disposed on the back surface of the camera via processing means 51. This processing means 51 is connected to recording means 52, and the photographed electronic image can be recorded. It is to be noted that this recording means 52 may be disposed separately from the processing means 51, and may be constituted to electronically record and reproduce data by use of a floppy disk, a memory card, a Magneto-optical disc or the like. The camera may be constituted as a silver salt film camera in which a silver salt film is disposed instead of the CCD 49.

Furthermore, an objective optical system 53 of the finder is disposed along the optical path 44 for the finder. The objective optical system 53 of the finder includes a plurality of lens units (four units in the drawing) and two prisms, and the system is a zoom optical system whose focal length changes in conjunction with the zoom lens system of the photographing optical system 41. The object image formed by this objective optical system 53 of the finder is formed on a view field frame 57 of an erecting prism 55 which is an image erecting member. An eyepiece optical system 59 which introduces an erected image into observer's eyeball E is disposed behind the erecting prism 55. It is to be noted that a cover member 50 is disposed on an exit side of the eyepiece optical system 59.

Since the photographing optical system 41 has a high performance and a small size, and the system can be collapsed and stored in the digital camera 40 constituted in this manner, performance improvement and miniaturization can be realized.

The present invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A image taking apparatus equipped with a zoom lens system which comprises, in order from an object side, a first lens unit having a positive refractive power; a second lens unit having a negative refractive power; a third lens unit having a positive refractive power; and a fourth lens unit having a positive refractive power, wherein at least the first lens unit, the second lens unit, and the third lens unit move during zooming from a wide-angle end to a telephoto end so that a space between the first lens unit and the second lens unit increases, a space between the second lens unit and the third lens unit decreases, and a space between the third lens unit and the fourth lens unit increases, the first lens unit includes a single lens component or a cemented lens component, and is arranged closer to an image side in the wide-angle end than in the telephoto end, the third lens unit includes, in order from the object side, a positive lens element, a positive lens element, and a negative lens element, the number of lens component included in the first lens unit is one, and the number of lens components included in the third lens unit is three in total, and the zoom lens system satisfies the following conditions:

$$-0.5 < d2/r1 < 2 \quad (A); \text{ and}$$

$$0.725 < IH/fr < 0.8 \quad (B),$$

wherein IH denotes an image height, fr denotes a focal length of the zoom lens system, d2 denotes a space between the second lens unit and the third lens unit at a time when the focal length fr of the zoom lens system has any value that satisfies the condition (B), and r1 denotes a radius of curvature of a surface closest to the object side in the first lens unit.

2. The apparatus according to claim 1, satisfying the following condition:

$$2 < f4/fw < 3.5 \quad (2),$$

wherein f4 denotes a focal length of the fourth lens unit, and fw denotes a focal length of the zoom lens system in the wide-angle end.

3. The apparatus according to claim 1, satisfying the following condition:

$$0.9 < f1/Lw < 1.2 \quad (3),$$

wherein f1 denotes a focal length of the first lens unit, and Lw denotes a total length of the zoom lens system in the wide-angle end.

4. The apparatus according to claim 1, satisfying the following condition:

$$2.7 < D2(w)/D3(w) < 5.0 \quad (4),$$

wherein D2(w) denotes a space between the second lens unit and the third lens unit in the wide-angle end, and D3(w) denotes a space between the third lens unit and the fourth lens unit in the wide-angle end.

5. The apparatus according to claim 1, satisfying the following condition:

$$5 < |f1/f2| < 5.7 \quad (5),$$

wherein f1 denotes a focal length of the first lens unit, and f2 denotes a focal length of the second lens unit.

6. The apparatus according to claim 1, satisfying the following condition:

$$0.6 < f3/f4 < 1.2 \quad (6),$$

wherein f3 denotes a focal length of the third lens unit, and f4 denotes a focal length of the fourth lens unit.

7. The apparatus according to claim 1, satisfying the following condition:

$$0.3 < D3(t)/ft < 0.7 \quad (7),$$

wherein D3(t) denotes a space between the third lens unit and the fourth lens unit in the telephoto end, and ft denotes a focal length of the zoom lens system in the telephoto end.

8. The apparatus according to claim 1, satisfying the following condition:

$$1.6 < h3(w)/h'3(w) < 1.8 \quad (8),$$

wherein h3(w) denotes a height of ray in a case where an axial marginal ray enters an object-side surface of the third lens unit in the wide-angle end, and h'3(w) denotes a height of ray in a case where the axial marginal ray exits from an image-side surface of the third lens unit in the wide-angle end.

9. The apparatus according to claim 1, satisfying the following condition:

$$1.5 < h3(t)/h'3(t) < 1.7 \quad (9),$$

wherein h3(t) denotes a height of ray in a case where an axial marginal ray enters an object-side surface of the third lens unit in the telephoto end, and h'3(t) denotes a height of ray in a case where the axial marginal ray exits from an image-side surface of the third lens unit in the telephoto end.

10. The apparatus according to claim 1, wherein the second lens unit includes, in order from the object side, a first negative lens element, a second negative lens element, and a positive lens element, a material of each of the first and second negative lens elements has a refractive index of 1.81 or more, and a material of the positive lens element has a refractive index of 1.85 or more.

11. The apparatus according to claim 1, wherein the second lens unit includes no aspherical surface.

12. A image taking apparatus equipped with a zoom lens system which comprises, in order from an object side, a first lens unit having a positive refractive power; a second lens unit having a negative refractive power; a third lens unit having a positive refractive power; and a fourth lens unit having a positive refractive power, wherein at least the first lens unit, the second lens unit, and the third lens unit move during zooming from a wide-angle end to a telephoto end so that a space between the first lens unit and the second lens unit increases, a space between the second lens unit and the third lens unit decreases, and a space between the third lens unit and the fourth lens unit increases, the first lens unit includes only one lens component, and is arranged closer to an image side in the wide-angle end than in the telephoto end, and the zoom lens system satisfies the following conditions:

$$-0.5 < d2/r1 < 2 \quad (A);$$

$$0.725 < IH/fr < 0.8 \quad (B); \text{ and}$$

$$0.8 < h4(w)/h4(t) < 0.9 \quad (1),$$

wherein IH denotes an image height, fr denotes a focal length of the zoom lens system, d2 denotes a space between the second lens unit and the third lens unit at a time when the focal length fr of the zoom lens system has any value that satisfies the condition (B), r1 denotes a radius of curvature of a surface closest to the object side in the first lens unit, $h4(w)$ denotes a height of ray in a case where an axial marginal ray enters an object-side surface of the fourth lens unit in the wide-angle end, and $h4(t)$ denotes a height of ray in a case where the axial marginal ray enters the object-side surface of the fourth lens unit in the telephoto end.

13. The apparatus according to claim 12, wherein the third lens unit includes, in order from the object side, a positive lens component, a positive lens component, and a negative lens component, or a positive lens component and a cemented lens.

14. The apparatus according to claim 12, wherein an aperture stop is disposed on an incidence side of the third lens unit, and the third lens unit moves integrally with the aperture stop during the zooming.

15. The apparatus according to claim 12, wherein the second lens unit includes three lens elements including a negative meniscus lens element, a negative lens element, and a positive lens element in order from the object side, or four lens elements including a negative meniscus lens element, a negative meniscus lens element, a negative lens element, and a positive lens element in order from the object side.

16. The apparatus according to claim 12, wherein the second lens unit includes two negative lens elements and one positive lens element, a material of each of the first and second negative lens elements from the object side has a refractive index of 1.81 or more, and a material of the positive lens element has a refractive index of 1.85 or more.

17. The apparatus according to claim 12, satisfying the following condition:

$$2 < f4/fw < 3.5 \quad (2),$$

wherein f4 denotes a focal length of the fourth lens unit, and fw denotes a focal length of the zoom lens system in the wide-angle end.

18. The apparatus according to claim 12, satisfying the following condition:

$$0.9 < f1/Lw < 1.2 \quad (3),$$

wherein f1 denotes a focal length of the first lens unit, and Lw denotes a total length of the zoom lens system in the wide-angle end.

19. The apparatus according to claim 12, satisfying the following condition:

$$2.7 < D2(w)/D3(w) < 5.0 \quad (4),$$

wherein $D2(w)$ denotes a space between the second lens unit and the third lens unit in the wide-angle end, and $D3(w)$ denotes a space between the third lens unit and the fourth lens unit in the wide-angle end.

20. The apparatus according to claim 12, satisfying the following condition:

$$5 < |f1/f2| < 5.7 \quad (5),$$

wherein f1 denotes a focal length of the first lens unit, and f2 denotes a focal length of the second lens unit.

21. The apparatus according to claim 12, satisfying the following condition:

$$0.6 < f3/f4 < 1.2 \quad (6),$$

wherein f3 denotes a focal length of the third lens unit, and f4 denotes a focal length of the fourth lens unit.

22. The apparatus according to claim 12, satisfying the following condition:

$$0.3 < D3(t)/ft < 0.7 \quad (7),$$

wherein $D3(t)$ denotes a space between the third lens unit and the fourth lens unit in the telephoto end, and ft denotes a focal length of the zoom lens system in the telephoto end.

23. The apparatus according to claim 12, satisfying the following condition:

$$1.6 < h3(w)/h'3(w) < 1.8 \quad (8),$$

wherein $h3(w)$ denotes a height of ray in a case where an axial marginal ray enters an object-side surface of the third lens unit in the wide-angle end, and $h'3(w)$ denotes a height of ray in a case where the axial marginal ray exits from an image-side surface of the third lens unit in the wide-angle end.

24. The apparatus according to claim 12, satisfying the following condition:

$$1.5 < h3(t)/h'3(t) < 1.7 \quad (9),$$

wherein $h3(t)$ denotes a height of ray in a case where an axial marginal ray enters an object-side surface of the third lens unit in the telephoto end, and $h'3(t)$ denotes a height of ray in a case where the axial marginal ray exits from an image-side surface of the third lens unit in the telephoto end.

25. The apparatus according to claim 12, wherein the second lens unit includes no aspherical surface.

* * * * *